(12) United States Patent
Nakamura

(10) Patent No.: US 7,843,804 B2
(45) Date of Patent: Nov. 30, 2010

(54) ORTHOGONAL FREQUENCY DIVISION MULTIPLEX TRANSMISSION METHOD

(75) Inventor: Takaharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 11/783,034

(22) Filed: Apr. 5, 2007

(65) Prior Publication Data
US 2007/0183310 A1    Aug. 9, 2007

Related U.S. Application Data

(60) Division of application No. 10/853,894, filed on May 26, 2004, which is a continuation of application No. PCT/JP01/10357, filed on Nov. 28, 2001.

(51) Int. Cl.
*H04J 11/00* (2006.01)
(52) U.S. Cl. ...................... 370/208; 370/335; 370/329; 370/288; 455/513; 455/522; 455/515; 455/115.3; 455/127.1
(58) Field of Classification Search ................. 370/335, 370/208, 329, 288; 455/513, 522, 515, 115.3, 455/127.1
See application file for complete search history.

(56) References Cited

U.S. PATENT DOCUMENTS

| | | | |
|---|---|---|---|
| 5,898,904 A | 4/1999 | Wang | |
| 6,031,827 A | 2/2000 | Rikkinen | |
| 6,088,573 A | 7/2000 | Tsuda | |
| 6,115,354 A | 9/2000 | Weck | |
| 6,151,295 A | 11/2000 | Ma | |
| 6,188,717 B1 | 2/2001 | Kaiser | |
| 6,411,817 B1 * | 6/2002 | Cheng et al. | ................ 455/522 |
| 6,434,205 B1 | 8/2002 | Taura | |
| 6,744,778 B1 | 6/2004 | Allpress | |
| 7,106,817 B2 | 9/2006 | Matsugatani | |
| 2002/0044540 A1 | 4/2002 | Mottier | |
| 2004/0160987 A1 | 8/2004 | Sudo | |
| 2005/0259629 A1 * | 11/2005 | Oliver et al. | ................ 370/345 |
| 2008/0025201 A1 | 1/2008 | Geile | |

FOREIGN PATENT DOCUMENTS

| | | |
|---|---|---|
| EP | 1 014 639 A2 | 6/2000 |
| EP | 1014639 | 6/2000 |
| EP | 1 035 693 A2 | 9/2000 |

(Continued)

OTHER PUBLICATIONS

Notice of Rejection Ground issued in corresponding Japanese Patent Application No. 2007-123774 (dated Jul. 14, 2009).

(Continued)

*Primary Examiner*—Vincent P Harper
*Assistant Examiner*—Fred A Casca
(74) *Attorney, Agent, or Firm*—Hanify & King, P.C.

(57) ABSTRACT

A transmission method includes transmitting a signal using an orthogonal frequency division multiplexing, receiving the transmitted signal at a plurality of reception devices, and controlling a transmission power for first signals transmitted to the plurality of reception devices in an area formed by the transmitter to be greater than a transmission power for second signals transmitted to a specific device in the area, wherein said first signals and said second signals are time division multiplexed.

20 Claims, 40 Drawing Sheets

FOREIGN PATENT DOCUMENTS

| | | |
|---|---|---|
| EP | 1035693 | 9/2000 |
| EP | 1035698 | 9/2000 |
| JP | 07-099522 | 4/1995 |
| JP | 9135230 | 5/1997 |
| JP | 09-321721 | 12/1997 |
| JP | 09-327073 | 12/1997 |
| JP | 9512156 | 12/1997 |
| JP | 10336088 | 12/1998 |
| JP | 11113049 | 4/1999 |
| JP | 11113049 A | 4/1999 |
| JP | 11-196062 | 7/1999 |
| JP | 11308195 | 11/1999 |
| JP | 11-355200 | 12/1999 |
| JP | 11-514827 | 12/1999 |
| JP | 2000-004208 | 1/2000 |
| JP | 2000069033 | 3/2000 |
| JP | 2000-165342 | 6/2000 |
| JP | 2000165342 | 6/2000 |
| JP | 2000-201134 | 7/2000 |
| JP | 2000-244441 | 9/2000 |
| JP | 2000-341247 | 12/2000 |
| JP | 2001024581 | 1/2001 |
| JP | 2001057535 | 2/2001 |
| JP | 2001-111519 | 4/2001 |
| JP | 2001-197037 | 7/2001 |
| JP | 2001217806 | 8/2001 |
| JP | 2001-268050 | 9/2001 |
| JP | 2001-320346 | 11/2001 |
| JP | 2002247005 | 8/2002 |
| JP | 2002374223 | 12/2002 |
| JP | 2003152670 | 5/2003 |
| JP | 2001069110 | 2/2009 |
| WO | 98/10542 | 3/1998 |
| WO | 9944326 | 9/1999 |
| WO | 9967898 | 12/1999 |

OTHER PUBLICATIONS

Atsushi Harada, et al. "Investigations on channel coding for broadband OFCDM packet wireless access in forward link considering QoS requirements." Technical Report of IEICE, Nov. 13, 2001, vol. 101, No. 437, pp. 25-30, RCS2001-181 (Partial English Translation Attached).
Notice of Rejection Ground issued in corresponding Japanese Patent Application No. 2007-123775 (dated Jul. 14, 2009) (Partial Translation Attached).
Yukiko Hanada, et al., "3-step cell search performance using frequency-multiplexed SCH for broadband multi-carrier CDMA wireless access", Technical Report of IEICE, Jul. 12, 2001, vol. 101, No. 197, pp. 73-78, RCS2001-91. (Partial English Translation Attached).
Yukiko Hanada, Kenichi Higuchi, and Mamoru Sawahashi, "Performance of 3-step fast cell search algorithm considering piliot channel structure in broadband multi-carrier CDMA wireless access", Proceedings of the 200 IEICE General Conference, Japan, The Institute of Electronics, Information and Communication Engineers, Mar. 7, 2001, Communication 1, pp. 783-784 (Partial English Translation Attached).
United States Patent Office Action issued in U.S. Appl. No. 10/853,894 (dated Jun. 10, 2009).
European Patent Office Communication Pursuant to Article 96(2) EPC based on application No. 01274838.0-2415 (dated Nov. 19, 2007).
Notice of Rejection Ground (issued in corresponding Japanese patent application No. 2006-326700) dated Jan. 6, 2009 (Partial English translation).
Shinsuke Hara, et al. Overview of Multicarrier CDMA, IEEE Communications Magazine. Dec. 1997 pp. 126-133.
Hiroyuki Atarashi, et al. Comparison of Broadband Packet Wireless Access. The Institute of Electronics, Information and Communication Engineers pp. 59-66.
Hiroyuki Atarashi, et al. Performance comparisons of coherent SC/DS-CDMA, MC/DS-CDMA on up-link broadband radio packet transmission. The Institute of Electronics, Information and Communication Engineers pp. 71-77.
Hiroyuki Atarashi, et al. High-speed TD-OFCDM Broadband Packet Wireless Access in Forward Link Using Multi-level Modulation and Hybrid ARQ. The Institute of Electronics, Information an d Communication Engineers pp. 57-62.
Sadayuki Abeta et al. Performance Comparisons of coherent SC/DS-CDMA, MC/DS-CDMA, on down-link broadband radio packet transmission. The Institute of Electronics, Information and Communication Engineers pp. 63-70.
Sadayuki Abeta et al. Performance of Coherent Multi-Carrier/DS-CDMA and MC-CDMA for Broadband Packet Wireless Access. IEICE Trans. Commun., vol. E84-B, No. 3 Mar. 2001 pp. 406-414.
Patent Office of the People's Republic of China, Notification of the First Office Action (PCT Application in the National Phase), dated: Apr. 13, 2007, Chinese Application No. 01823836.X (with English translation of Claims).
European Patent Office; Extended European Search Report; Application No. 07116354.7-2415; Reference No. P101470EP04; Nov. 20, 2007; 7-pps.
European Patent Office; Extended European Search Report; Application No. 07116378.6-2415; Reference No. P101470EP04; Nov. 21, 2007; 6-pps.
European Patent Office; Extended European Search Report; Application No. 07116349.7-2415; Reference No. P101470EP04; Nov. 21, 2007; 7-pps.
European Patent Office; Extended European Search Report; Application No. 07116376.0-2415; Reference No. P101470EP04; Nov. 21, 2007; 7-pps.
European Patent Office; Extended European Search Report; Application No. 07116347.1-2415; Reference No. P101470EP04; Nov. 22, 2007; 6-pps.
Notice of Rejection Ground dated Nov. 17, 2009 issued in corresponding Japanese patent application No. 2009-212385.
Notice of Rejection Ground dated Nov. 24, 2009 issued in corresponding Japanese patent application No. 2007-123774.
Notice of Rejection Ground dated Nov. 24, 2009 issued in corresponding Japanese patent application No. 2007-123775.
Rohling, H and others, Performance comparison of different multiple access schemes for the downlink of an OFDM communication system, Vehicular Technology Conference, 1997 IEEE 47', May 1997, vol. 3, pp. 1365-1369.
Non-Final Office action dated Jan. 21, 2010 received in U.S. Appl. No. 11/783,033.
Non-Final Office action dated Aug. 21, 2007 received in U.S. Appl. No. 10/853,894.
Non-Final Office action dated Oct. 20, 2008 received in U.S. Appl. No. 10/853,894.
Non-Final Office action dated Nov. 17, 2009 received in U.S. Appl. No. 10/853,894.
Final Office action dated Mar. 12, 2008 received in U.S. Appl. No. 10/853,894.
Notice of Rejection Ground dated Apr. 13, 2010 issued in corresponding Japanese Patent Application No. 2009-212385.
Notice of Rejection Ground dated Apr. 13, 2010 issued in corresponding Japanese Patent Application No. 2010-008598.
Supplementary European Search Report, Application No. EP 01274838.0-2415 PCT/JP0110357; P101470EPPC/TCS, Jul. 18, 2007.
A. M. Tonello et al., "*Analysis of the Uplink of an Asynchronous Multi-User DMT OFDMA System Impaired by Time Offsets, Frequency Offsets, and Multi-path Fading*" Vehicular Technology Conference, 2000. 52nd Sep. 24-28, 2000, Piscataway, NJ, USA, IEEE, vol. 3, Sep. 24, 2000, pp. 1094-1099.
Final Office Action dated Jul. 14, 2010 received in U.S. Appl. No. 10/853,894.
Notice of Rejection Ground dated Jun. 29, 2010 received in Japanese Patent Application No.: 2010-008598.
Decision of Rejection dated Jul. 6, 2010 received in Japanese Patent Application No.: 2009-212385.

* cited by examiner

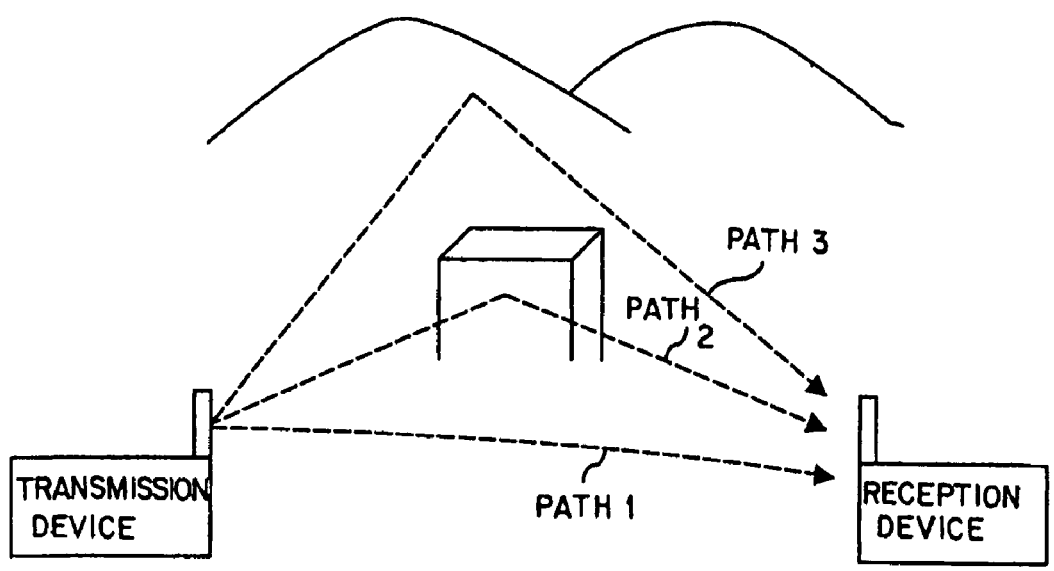
F I G. 4

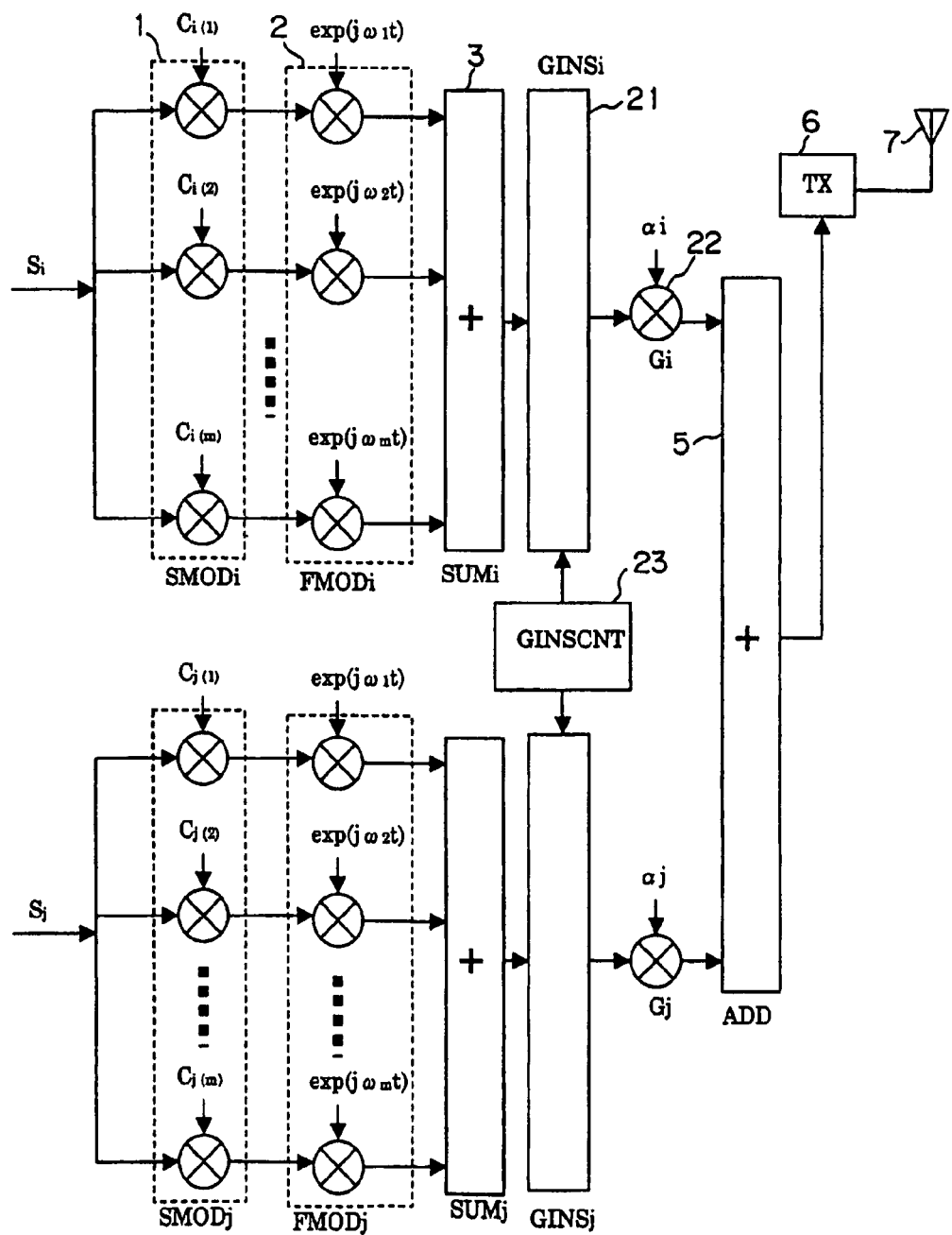
F I G. 6

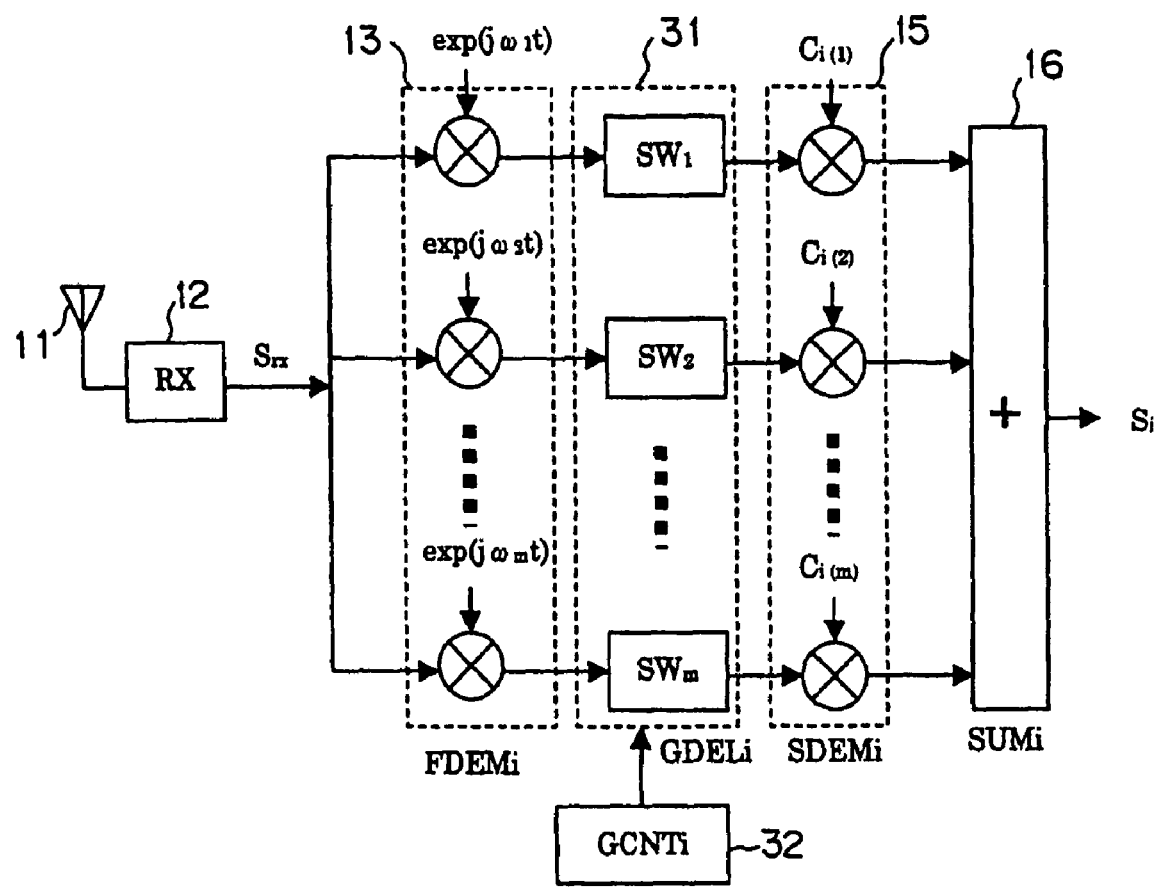
F I G. 7

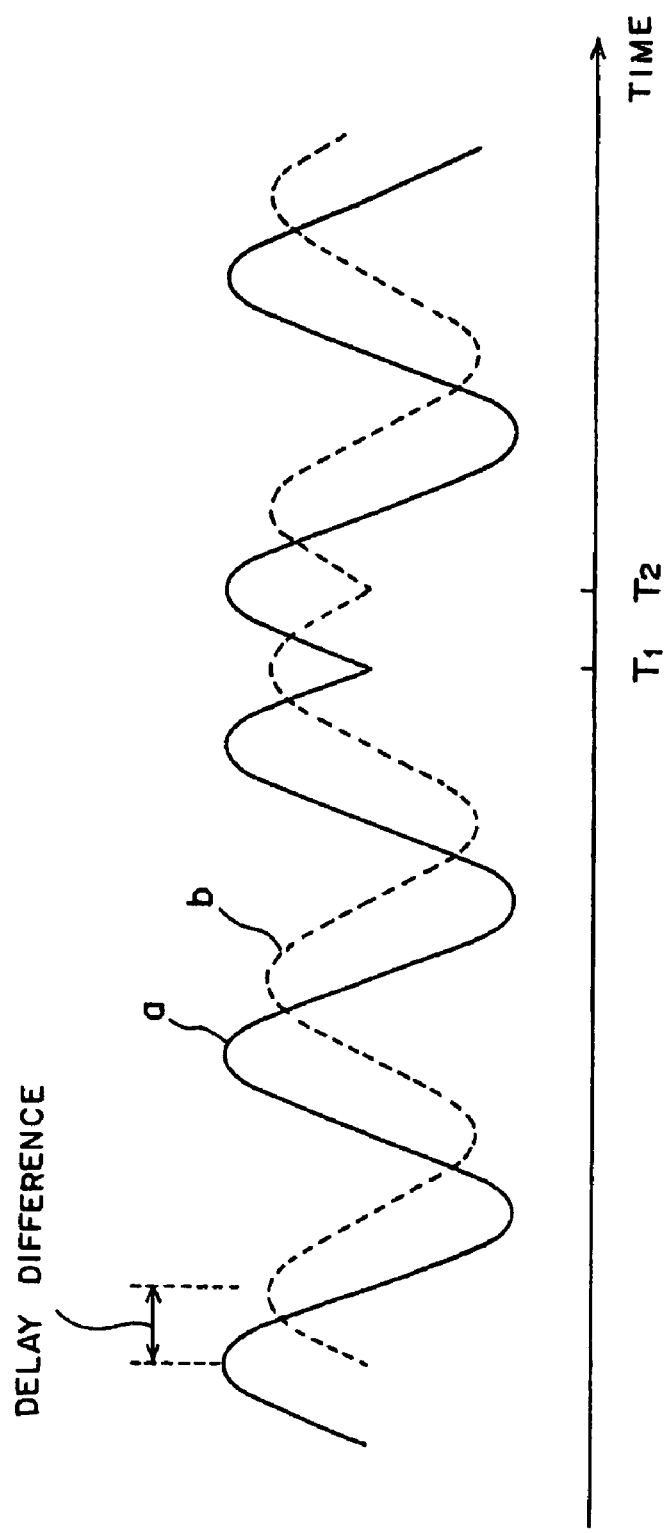
F I G. 10

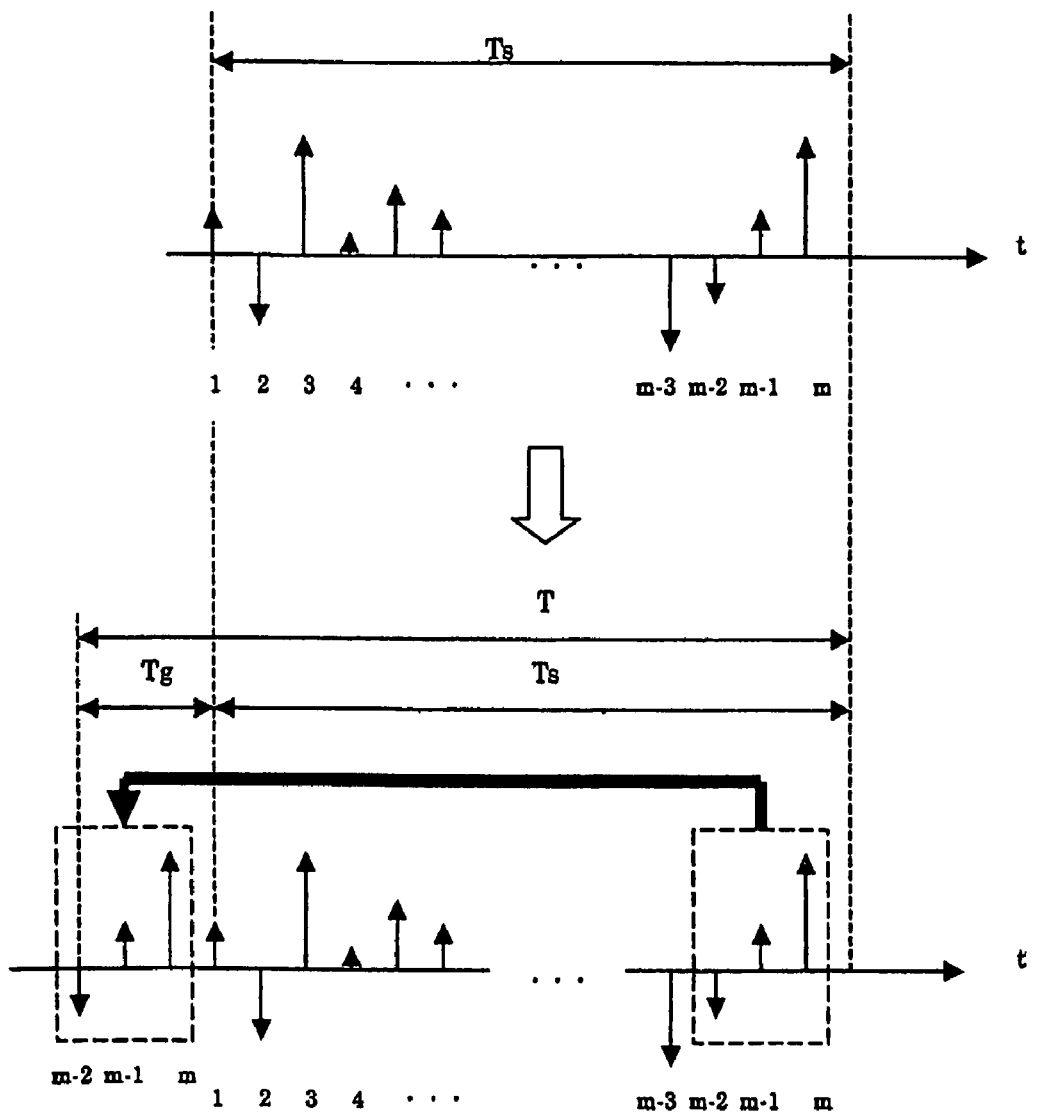
F I G. 12

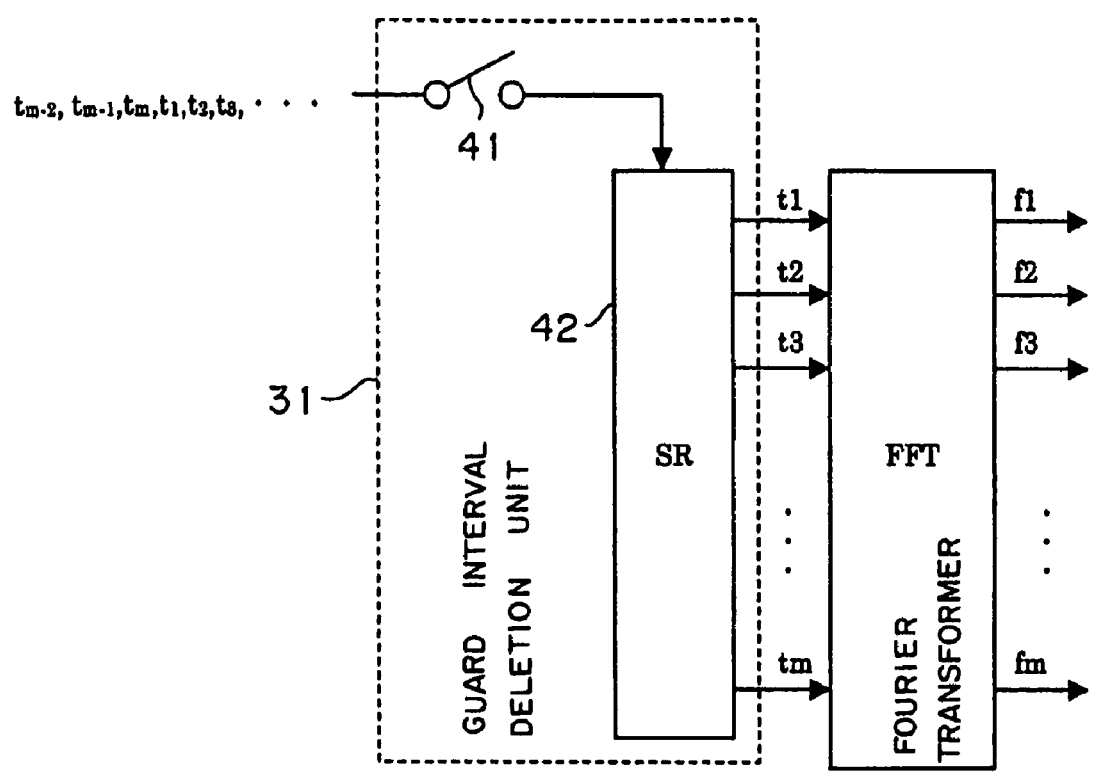
F I G. 14

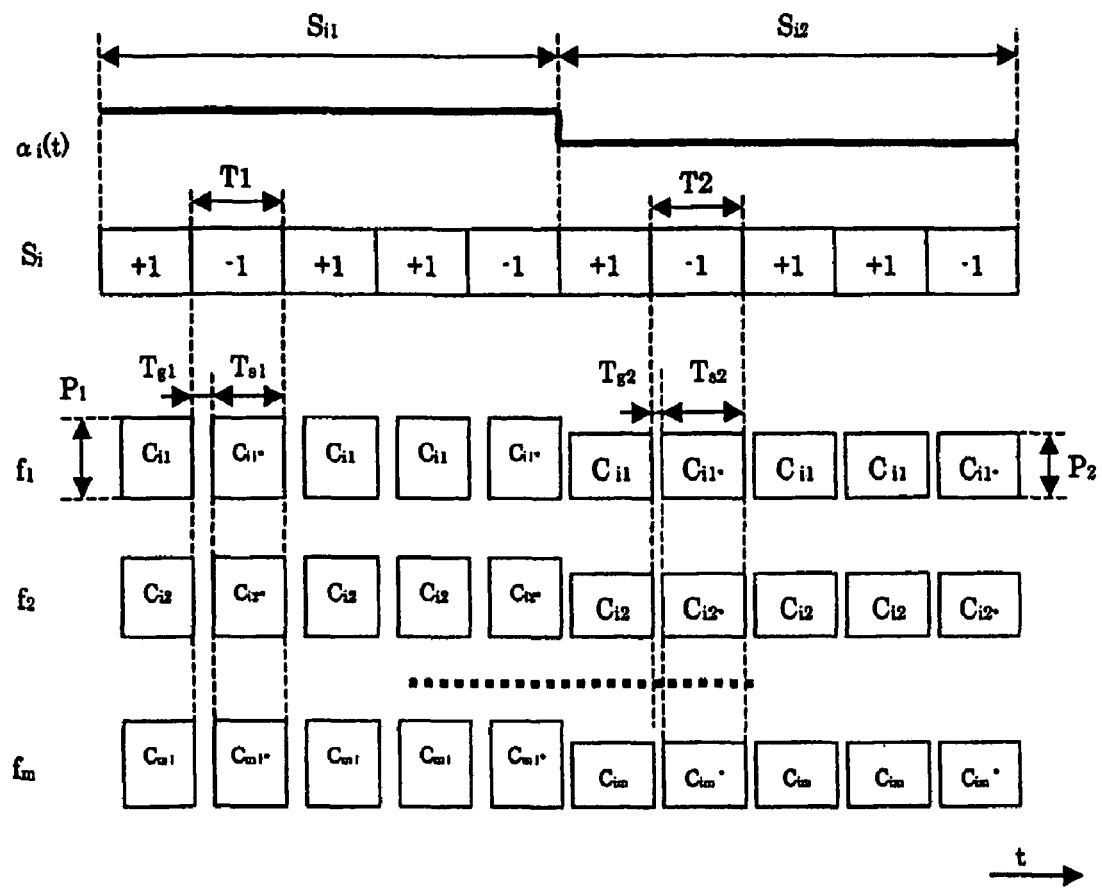
F I G. 17

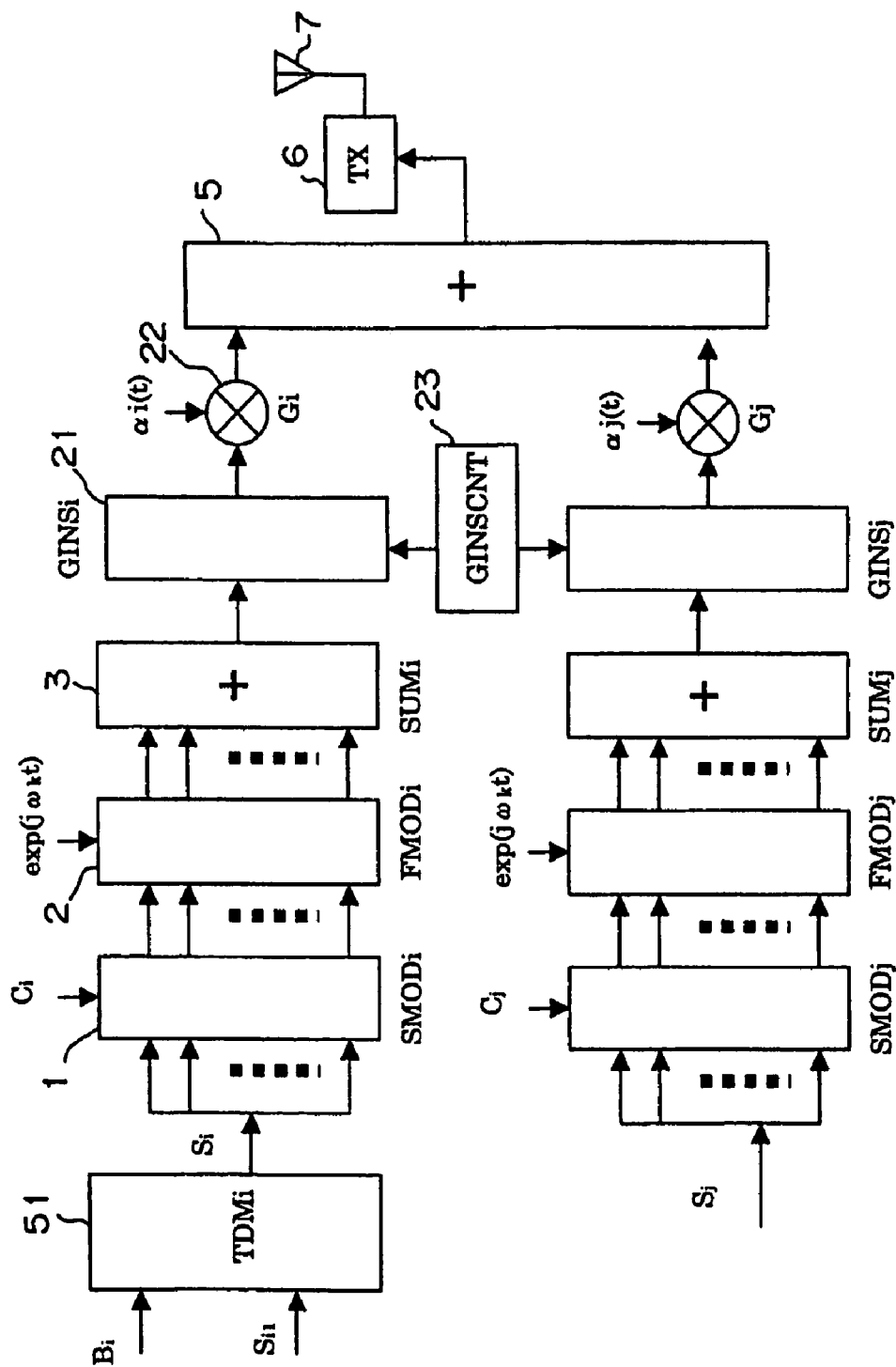
F I G. 18

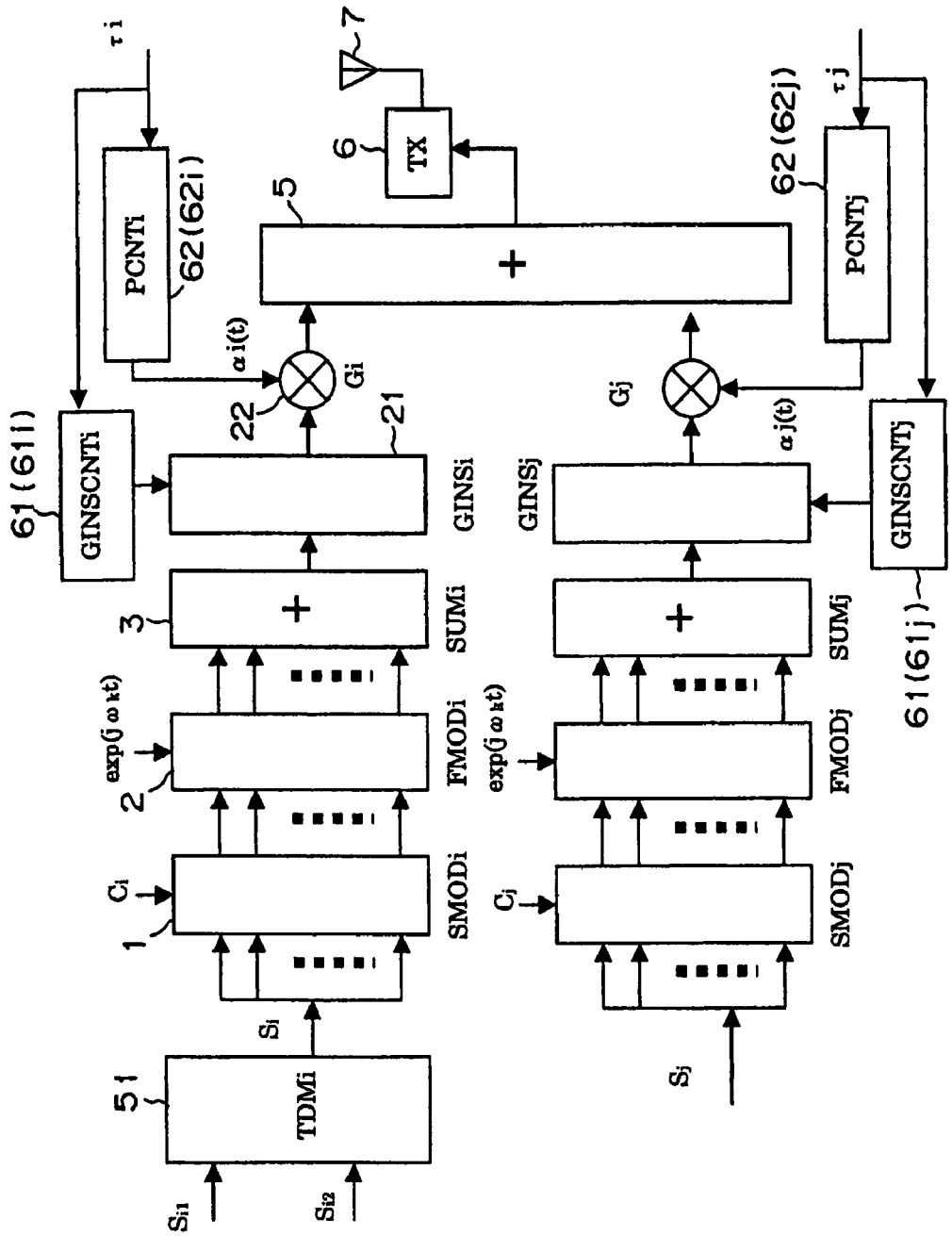
F I G. 21

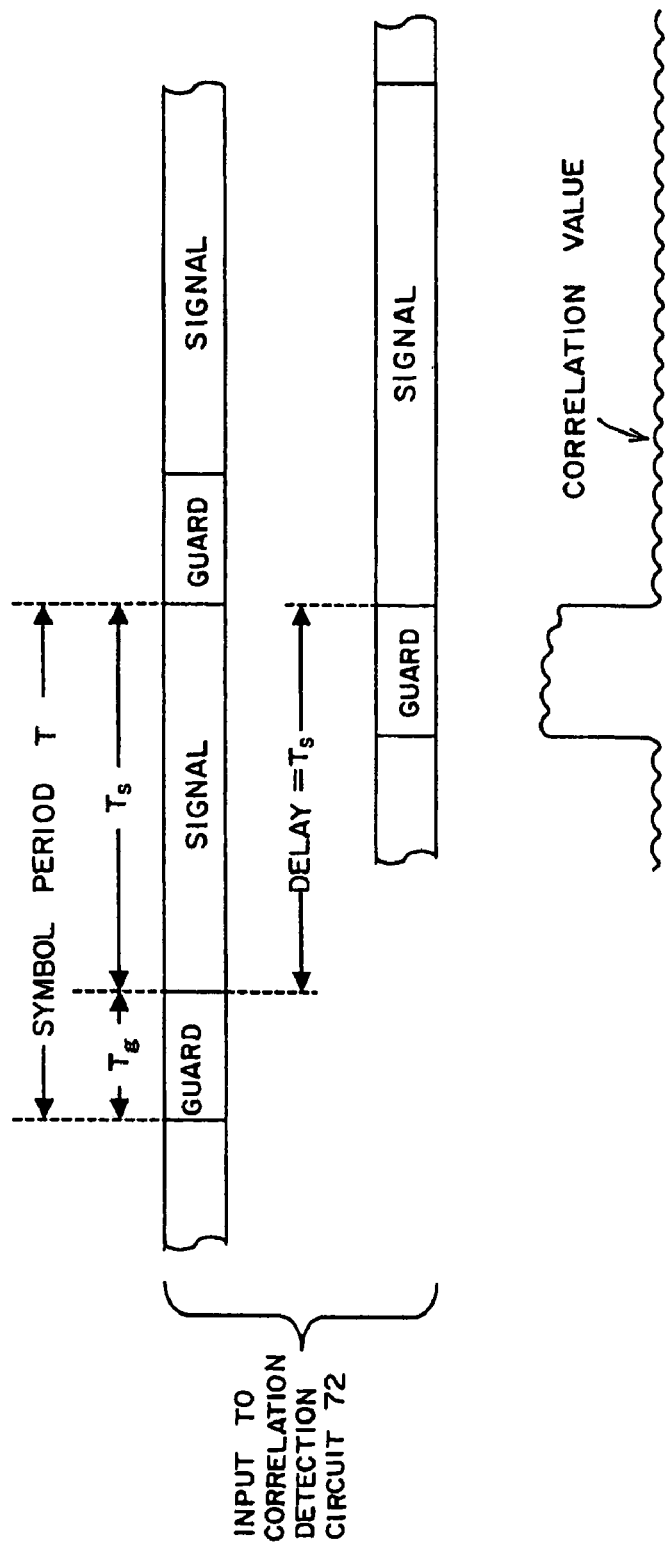
F I G. 24

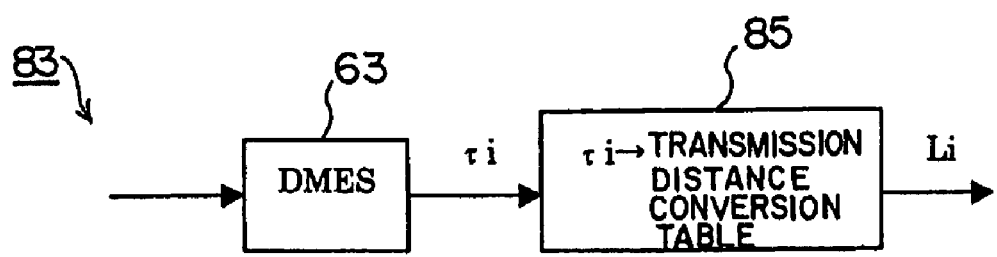
F I G. 28

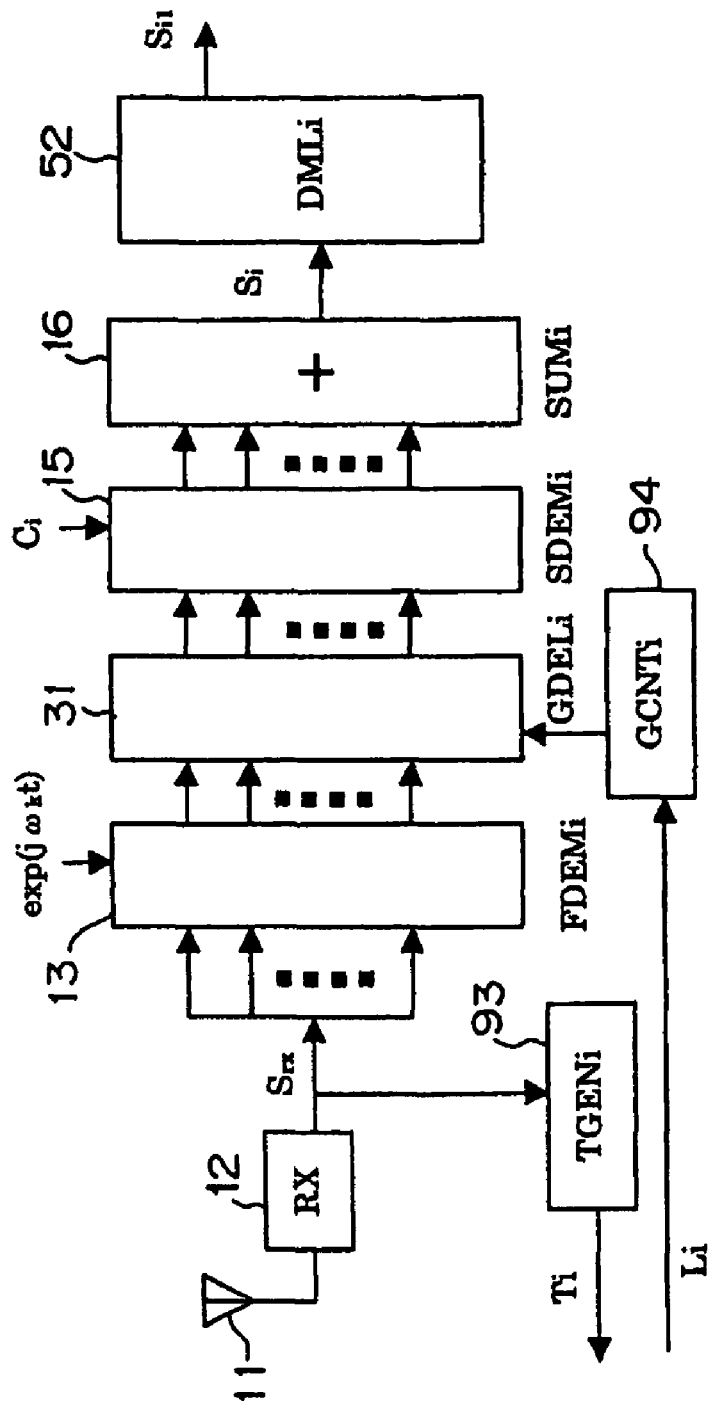
F I G. 30

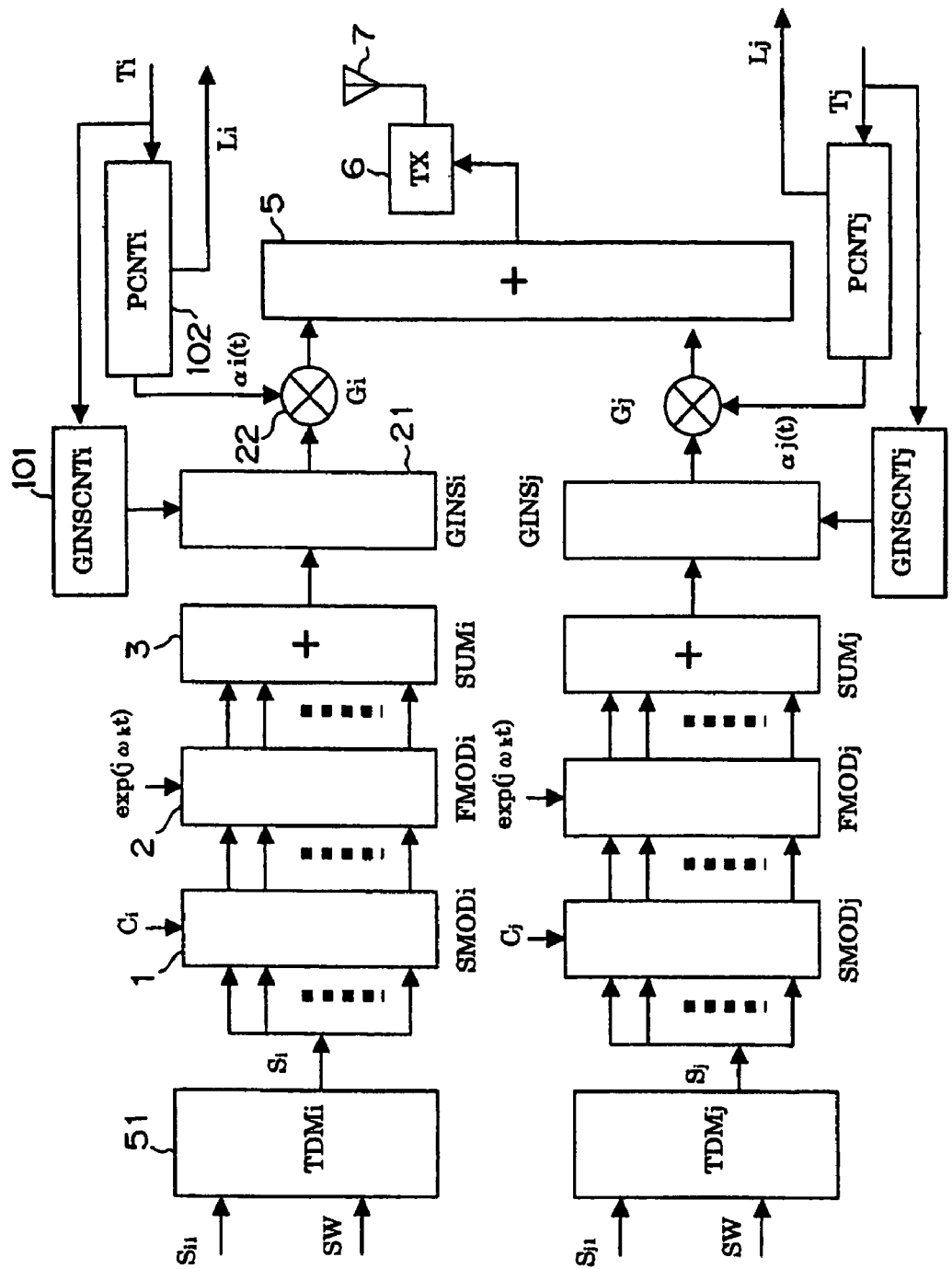
F I G. 32

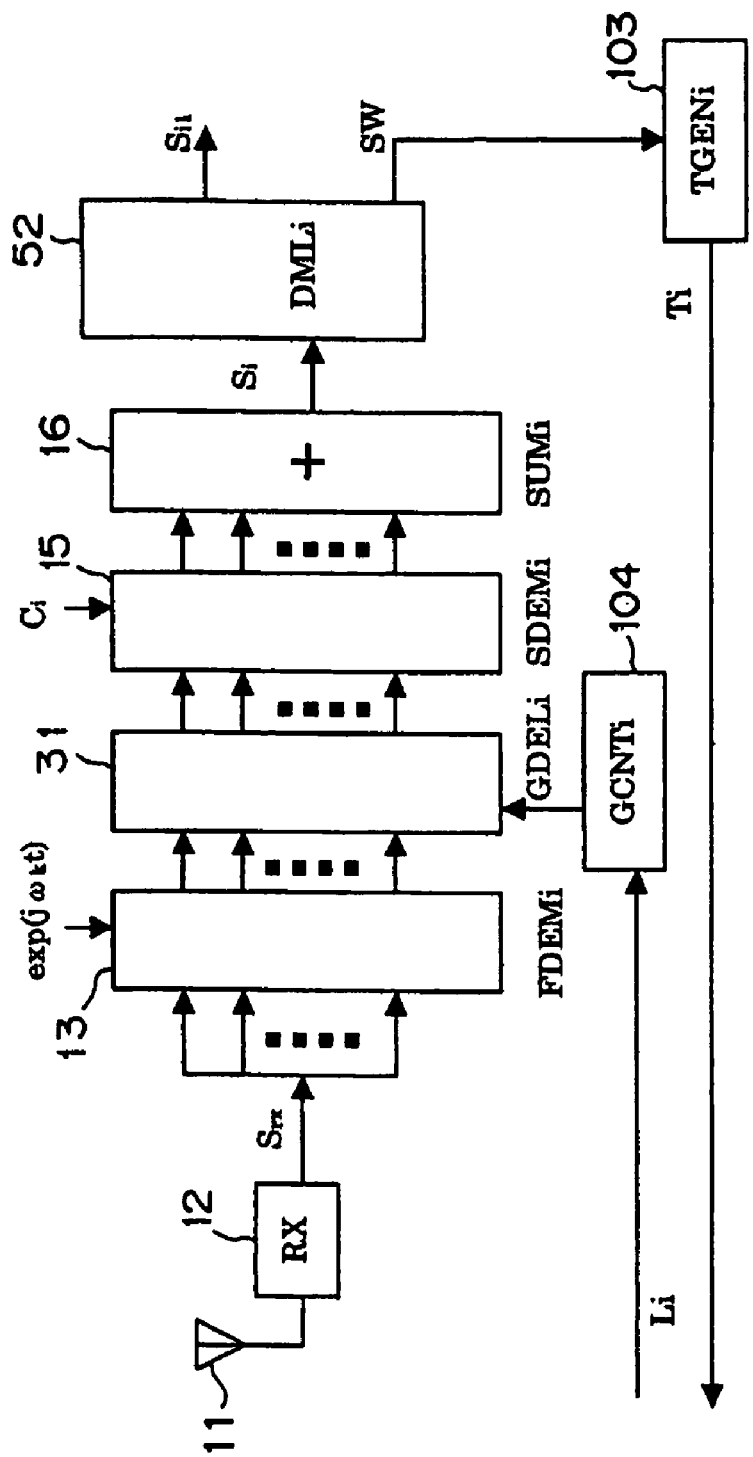
F I G. 33

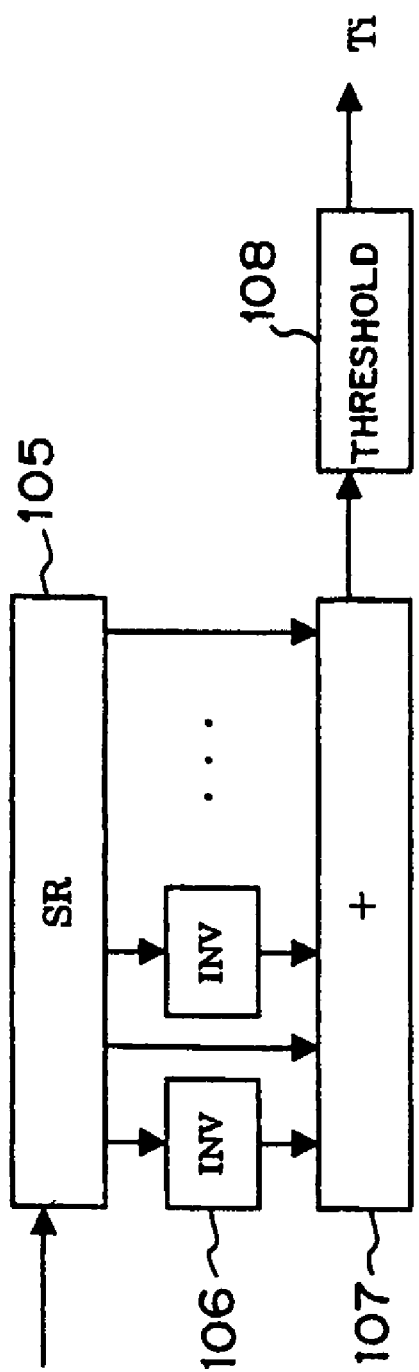
F I G. 34

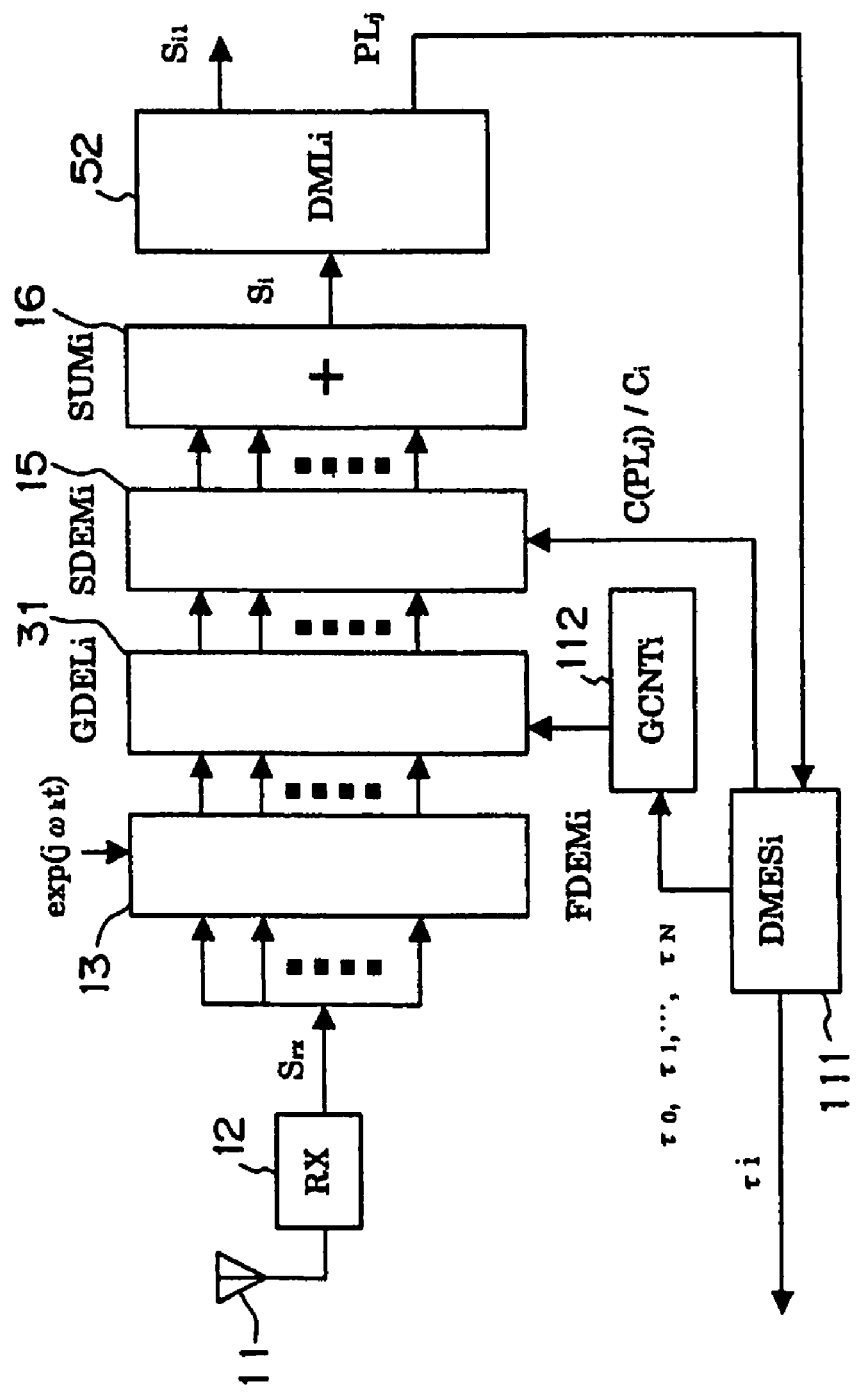
F I G. 36

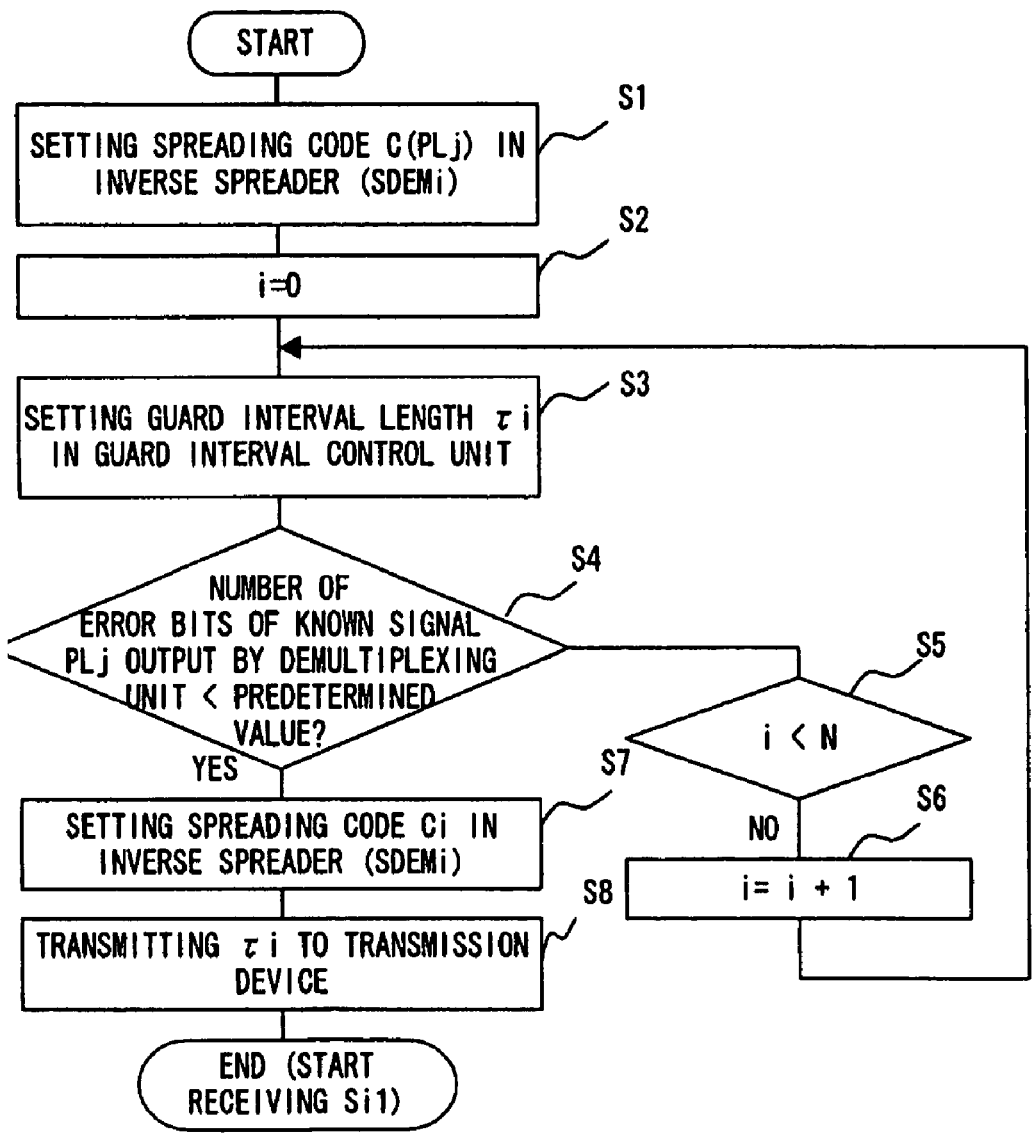
F I G. 3 7

ORTHOGONAL FREQUENCY DIVISION MULTIPLEX TRANSMISSION METHOD

CROSS REFERENCE TO RELATED APPLICATION

This application is a divisional of U.S. application Ser. No. 10/853,894, filed May 26, 2004, which is a continuation of an International Application No. PCT/JP01/10357, which was filed on Nov. 28, 2001, which are hereby incorporated by reference herein in their entirety.

BACKGROUND OF THE INVENTION

1. Field of the Invention

The present invention relates to an orthogonal frequency division multiplex and code division multiplex (OFDM-CDM) transmission system, and a transmission device (modulator) and a reception device (demodulator) for the system, and more specifically to an apparatus and a method for realizing the communications between a base station and a mobile station in the cellular phone system or the mobile phone communications system.

2. Description of the Related Art

Conventionally, an orthogonal frequency division multiplex (hereinafter referred to as an OFDM (orthogonal frequency division multiplex)) transmission system in a terrestrial digital television, etc. In the OFDM transmission system, data is transmitted using a plurality of subcarriers having different frequencies. Practically, in this system, a number of subcarrier orthogonal to one another are modulated in transmission data, and the subcarriers are frequency division multiplexed and transmitted. In the OFDM transmission system, even if high-speed data transmission is performed, the transmission rate can be lowered, that is to say, the transmission rate can be reduced for each subcarrier. Therefore, the influence of multipath interference can be reduced. The OFDM transmission system is described in, for example, "Overview of Multicarrier CDMA" (Hara et al., IEEE Communication Magazine, December 1997, pp 126-133), or "WIDEBAND WIRELESS DIGITAL COMMUNICATIONS", A. F. Molisch Prentice Hall PTR, 2001, ISBN:0-13-022333-6).

FIG. 1 shows the configuration of an existing transmission device for use in the OFDM transmission system. In this system, it is assumed that the transmission device multiplexes signal series Si and signal series Sj and outputs them. It is also assumed that the symbol period of the signal series Si and the signal series Sj is "T". Additionally, the signal series Si and the signal series Sj can be, for example, signals to be transmitted to different mobile stations. Otherwise, data to be transmitted to a plurality of mobile stations can be time-division-multiplexed in the signal series Si.

Each piece of the symbol information of the signal series Si is input in parallel to the m respective input terminals provided for a spread modulator 1. That is, the same symbol information is input in parallel in each symbol period T to each input terminal of the spread modulator 1. Then, the spread modulator 1 modulates the input symbol information using a spreading code Ci assigned to the signal series Si in advance, and outputs resultant spreading signals of m bits. The spreading code Ci is configured by "Ci(1)" through "Ci(m)", and is one element in the orthogonal code series.

A subcarrier modulator 2 generates m subcarriers having different angular frequencies $\omega_1 \sim \omega_m$. The angular frequency interval $\Delta\omega$ of $\omega_1, \omega_2, \omega_3, \ldots, \omega_m$ is a predetermined value defined by a reciprocal of the symbol period T, and is represented by the following equation.

$$\Delta\omega = 2\pi\Delta f = 2\pi/T$$

The subcarrier modulator 2 modulates m subcarriers using the spreading signal output from the spread modulator 1. Practically, for example, a subcarrier having the angular frequency $\omega_1$ is modulated according to the symbol information multiplied by "Ci(1)", and a subcarrier having the angular frequency $\omega_m$ is modulated according to the symbol information multiplied by "Ci(m)". These subcarriers are combined by an adder 3.

As shown in FIG. 2, a guard interval insert unit 4 inserts a guard interval fixedly determined in advance to a composite signal output from the adder 3 for each symbol. The guard interval is inserted to remove the multipath influence of a wireless transmission line. FIG. 2 shows the state of the guard interval inserted into each subcarrier. Practically, these subcarriers are combined.

An adder 5 adds up a composite signal corresponding to the signal series Si obtained as described above and a composite signal corresponding to the signal series Sj obtained in the similar process. A guard interval is inserted into each of the composite signal corresponding to the signal series Si and the composite signal corresponding to the signal series Sj. The output of the adder 5 is converted into a predetermined high-frequency signal by a transmitter 6, and then transmitted through an antenna 7.

FIG. 3 shows the configuration of an existing reception device for use in the OFDM transmission system. It is assumed that the reception device receives the signal series Si from a radio signal transmitted from the transmission device shown in FIG. 1. In FIG. 3, the frequency synchronizing capability, the timing synchronizing capability, etc. required to receive a signal are omitted.

The signal received by an antenna 11 is converted by a receiver 12 into a baseband signal Srx, and then converted into m received signal series by a subcarrier demodulator 13. Then, a guard interval deletion unit 14 deletes the guard interval from each received signal series. For the inverse spreading of each received signal series, a spread demodulator 15 multiplies each received signal series by the spreading code Ci which is the same as the spreading code used in the transmission device. Then, by adding each signal output from the spread demodulator 15 using an adder 16, the signal series Si is regenerated.

Between the transmission device and the reception device with the above-mentioned configuration, the signal series Si is transmitted using a plurality of subcarriers f1~fm shown in FIG. 2. The signal series Si is configured by the symbol information having the value of "+1" or "−1". That is, the signal series Si is changed into "+1" or "−1" in the symbol period T. Furthermore, a signal transmitted using each of the subcarriers f1~fm is spread-modulated by the spreading code Ci (Ci(1), Ci(2), . . . Ci(m) respectively). In FIG. 2, the bit marked with "*" indicates that the output of spread-modulation is inverted (conjugate) output because the signal series Si is "−1".

As described above, a guard interval is inserted into a transmitted signal for each symbol. In the example shown in FIG. 2, the guard interval Tg is inserted in the symbol period T. Therefore, the inverse-spreading/demodulating process is performed in a section (section Ts) obtained by removing the guard interval Tg for each subcarrier in the reception device. Thus, multipath interference (interference generated by a delay wave) can be removed in the reception device.

Since the guard interval Tg is inserted to remove the multipath interference, it is necessary to set the length longer than the maximum transmission delay difference in the transmission link. The "maximum transmission delay difference" refers to the difference between the minimum propagation time and the maximum propagation time obtained when a signal is transmitted through a plurality of paths from the transmission device to the reception device. For example, in FIG. 4, assume that the signal transmitted through a path 1 first reaches the reception device, and the signal transmitted through a path 3 last reaches the reception device, then the maximum transmission delay difference is represented by the difference between the propagation time of the path 3 and the propagation time of the path 1.

However, in the cellular communications system, radio signal is normally transmitted from one base station to a plurality of mobile stations in a service area. The maximum transmission delay difference of a signal transmitted from a base station to a mobile station becomes larger as the distance between them increases. Assuming that the multipath interference is to be removed from all mobile stations in the service area, it is necessary to remove the multipath interference in the mobile station located farthest from the base station. Therefore, if the multipath interference is to be removed from all mobile stations in the service area, then it is necessary to set the guard interval Tg larger than a maximum transmission delay difference in a case where a signal is transmitted to a mobile station located farthest from the base station. For example, in the example shown in FIG. 5, it is necessary to set the guard interval Tg larger than the maximum transmission delay difference obtained when a signal is transmitted from the base station to the mobile station MS3.

However, if the difference in guard interval is determined as described above, the guard interval is unnecessarily long when a signal is transmitted to a mobile station (the mobile station MS1 in FIG. 5) located near the base station. In the meantime, the power of the signal in a guard interval is not used when a signal series is regenerated in a reception device. Therefore, if a guard interval is determined as described above, power is wasted when a signal is transmitted to a mobile station. As a result, the total transmission capacity of the entire communications system is reduced.

SUMMARY OF THE INVENTION

The present invention aims at improving the transmission efficiency of a signal in a communications system using the orthogonal frequency division multiplex and code division multiplex (OFDM-CDM) transmission system.

The communications system according to the present invention transmits a signal from a transmission device to a reception device using orthogonal frequency division multiplex. The transmission device includes a modulation unit for modulating a plurality of subcarriers using a signal series; an insertion unit for inserting a guard interval into the output of the modulation unit; and a transmission unit for transmitting a modulation signal into which the guard interval is inserted. The reception device includes a demodulation unit for regenerating a signal series by performing a deleting process to delete the guard interval and a demodulating process on a modulation signal transmitted from the transmission device for each subcarrier. The length of the guard interval is determined based on the communications environment between the transmission device and the reception device.

In this communications system, the length of a guard interval is determined based on the communications environment between a transmission device and a reception device. That is to say, the length of a guard interval can be the shortest possible depending on the communications environment between the transmission device and the reception device, thereby enhancing the communication efficiency.

In the above configuration, the transmission device can further include a power control unit for controlling the transmission power depending on the length of the guard interval while the modulation signal is transmitted. With this configuration, the transmission power in transmitting a signal series can be smallest possible. Therefore, the interference among the signals can be reduced.

Also in the above configuration, the reception device can also include a monitor unit for monitoring the communications quality while a signal is transmitted from the transmission device to the reception device so that the length of the guard interval is determined to attain predetermined communications quality. With this configuration, the shortest possible guard interval, which satisfies a desired communications quality, can be set.

Another aspect of the communications system according to the present invention is a communications system for transmitting a signal from a transmission device to a plurality of reception devices including a first reception device using orthogonal frequency division multiplex. The transmission device includes a modulation unit for modulating a plurality of subcarriers using a signal series obtained by multiplexing a first signal series to be transmitted to a first reception device and a second signal series to be transmitted to another reception device than the first reception device; an insertion unit for inserting a first guard interval into modulated output of the first signal series and inserting a second guard interval into modulated output of the second signal series; and a transmission unit for transmitting modulation signals into which the first guard interval and the second guard interval are respectively inserted. The first reception device includes a demodulation unit for regenerating a first signal series by performing a deleting process to delete the first guard interval and a demodulating process. The length of the first guard interval is determined based on the communications environment between the transmission device and the first reception device, and the length of the second guard interval is determined based on the communications environment between the transmission device and the other reception device. With this configuration, an appropriate guard interval can be set for each signal series when a plurality of signal series are transmitted in a time-division-multiplexed system.

BRIEF DESCRIPTION OF DRAWINGS

FIG. 4 is an explanatory view of the multipath environment;

FIG. 6 shows the configuration of a transmission device according to an embodiment of the present invention;

FIG. 7 shows the configuration of a reception device according to an embodiment of the present invention;

FIG. 10 is an explanatory view of a guard interval;

FIG. 12 is an explanatory view of the process of inserting a guard interval;

FIG. 14 shows an embodiment of the configuration for realizing a process of deleting a guard interval from a received wave;

FIG. 17 is a schematic diagram of a transmission signal in the communications system according to the first embodiment of the present invention;

FIG. 18 shows the configuration of the transmission device according to the second embodiment of the present invention;

FIG. 21 shows the configuration of the transmission device according to the third embodiment of the present invention;

FIG. 24 is an explanatory view of the operation of a delay difference detection unit;

FIG. 28 shows the configuration of an example of the distance estimate unit shown in FIG. 27;

FIG. 30 shows the configuration of the reception device according to the fifth embodiment of the present invention;

FIG. 32 shows the configuration of the transmission device according to the sixth embodiment of the present invention;

FIG. 33 shows the configuration of the reception device according to the sixth embodiment of the present invention;

FIG. 34 shows the configuration of an example of the timing generation unit shown in FIG. 33;

FIG. 36 shows the configuration of the reception device according to the seventh embodiment of the present invention;

FIG. 37 is a flowchart of the operation of the delay difference detection unit shown in FIG. 36;

DESCRIPTION OF THE PREFERRED EMBODIMENTS

The embodiment of the present invention is described below by referring to the attached drawings. In the explanation below, it is assumed that the orthogonal frequency division multiplex and code division multiplex (OFDM-CDM) transmission system is used in the cellular communications system. Practically, for example, the OFDM-CDM is used for transmission of a signal between a base station and a mobile station.

Figure 5:
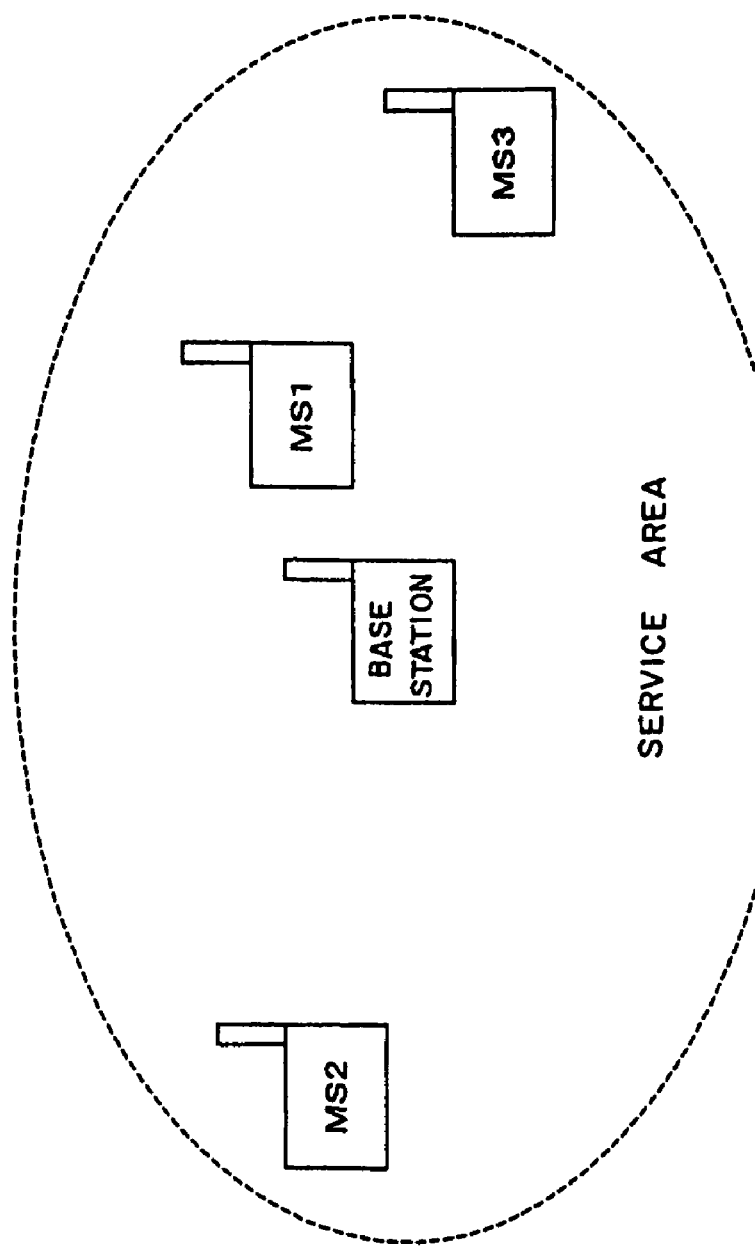
FIG. 5 shows a base station accommodating a plurality of mobile stations.

FIG. 6 shows the configuration of the transmission device according to an embodiment of the present invention. The transmission device corresponds to, for example, a device for a base station in FIG. 5. The transmission device is assumed to multiplex and output a signal series Si and a signal series Sj. The signal series Si and the signal series Sj can be, for example, signals to be transmitted to different mobile stations. Otherwise, data to be transmitted to a plurality of mobile stations can be time-division-multiplexed in the signal series Si or the signal series Sj.

The transmission device comprises a spread modulator (SMOD) 1, a subcarrier modulator (FMOD: Frequency Modulator) 2, an adder (SUM) 3, a guard interval insert unit (GINS) 21, and a gain adjuster (G) 22. The spread modulator 1, the subcarrier modulator 2, and the adder 3 can be realized by the corresponding circuits explained by referring to FIG. 1. That is to say, the spread modulator 1 is provided with m input terminals, and the same symbol information is input in parallel in each symbol period T to each input terminal of the spread modulator 1. Then, the spread modulator 1 modulates the input symbol information using a spreading code $C_i$ assigned to the respective signal series Si in advance, and outputs resultant spread signals of m bits. The spreading code $C_i$ is configured by "$C_i(1)$" through "$C_i(m)$", and is one element in the orthogonal code series.

A subcarrier modulator 2 generates m subcarriers having different angular frequencies $\omega 1 \sim \omega m$. The angular frequency interval $\Delta\omega$ of $\omega 1, \omega 2, \omega 3, \ldots, \omega m$ is a predetermined value defined by a reciprocal of the symbol period T, and is represented by the following equation.

$$\Delta\omega = 2\pi\Delta f = 2\pi/T$$

The subcarrier modulator 2 modulates m subcarriers using the spread signal output from the spread modulator 1. Practically, for example, a subcarrier having the angular frequency $\omega 1$ is modulated according to the symbol information multiplied by "$C_i(1)$", and a subcarrier having the angular frequency $\omega m$ is modulated according to the symbol information multiplied by "$C_i(m)$". The process of the subcarrier modulator 2 is realized by, for example, an inverse Fourier transform. Each subcarrier output from the subcarrier modulator 2 is combined by adder 3.

The guard interval insert unit 21 inserts a guard interval into a composite signal output from the adder 3 for each symbol. The guard interval is inserted to remove the multipath influence of a wireless transmission link. The guard interval insert unit 4 of the existing transmission device shown in FIG. 1 inserts a fixedly predetermined guard interval, but the guard interval insert unit 21 inserts a guard interval determined depending on the communications status between the transmission device and the reception device. The length of a guard interval is determined by a guard interval control unit (GINSCNT) 23 for each signal series.

The gain adjuster 22 is, for example, a multiplier, and multiplies a signal into which a guard interval is inserted by a gain coefficient α. Thus, the amplitude or the power of the signal to be transmitted is adjusted. The gain coefficient α is basically determined corresponding to the length of the guard interval inserted for each signal series.

Figure 1:
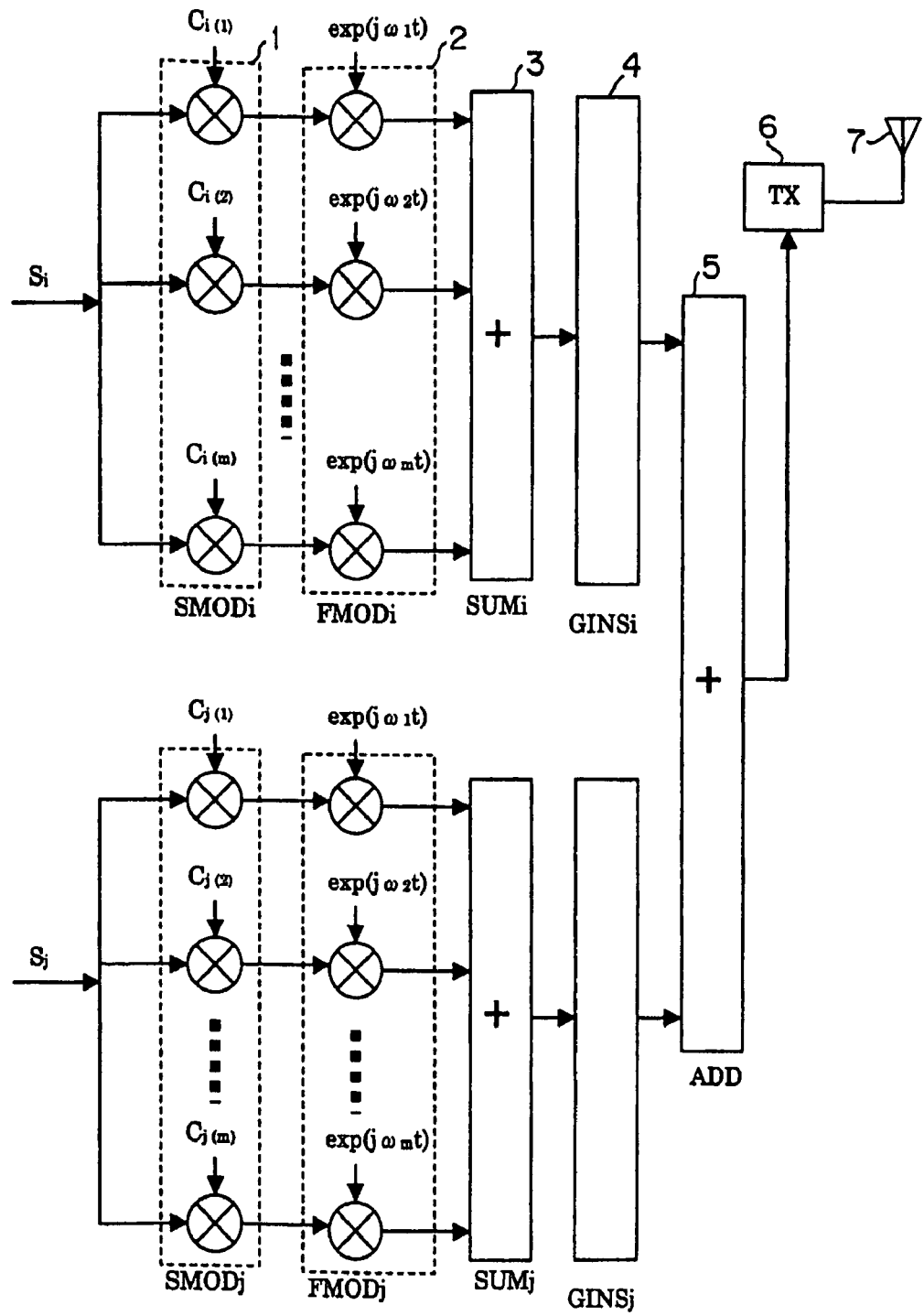
FIG. 1 shows the configuration of an existing transmission device for use in an OFDM transmission system.
Figure 2:
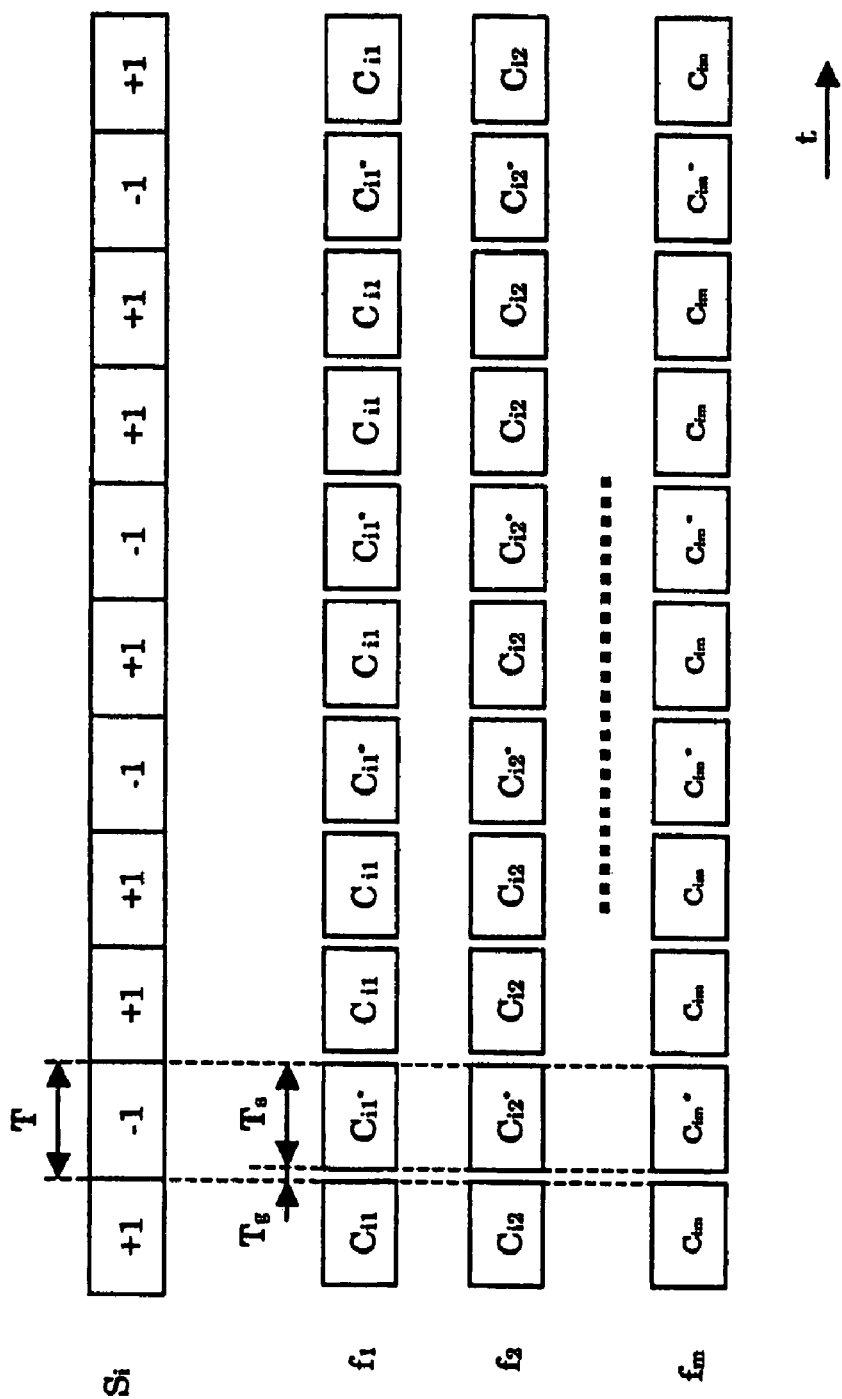
FIG. 2 shows an example of a transmission signal in an existing OFDM transmission system.
Figure 3:
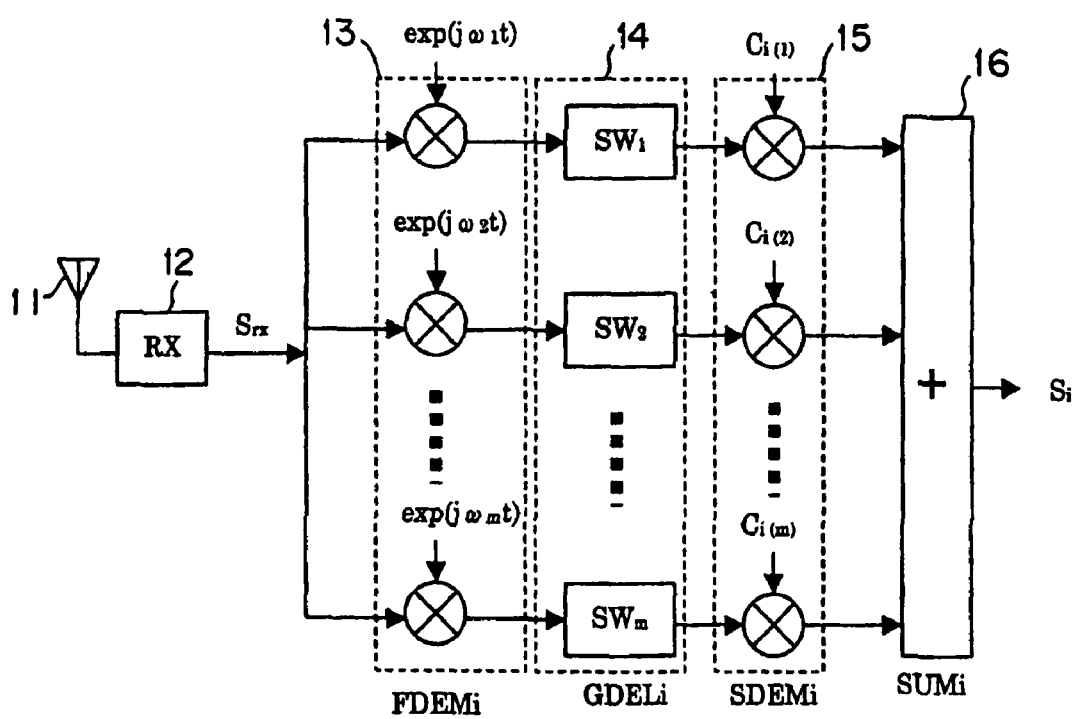
FIG. 3 shows the configuration of an existing reception device for use in an OFDM transmission system.

The composite signal for each signal series obtained as described above is added up by the adder (ADD) 5 as in the case of the existing transmission device shown in FIG. 1. Then, the output of the adder 5 is converted into a predetermined high-frequency signal by the transmitter (TX) 6, and then transmitted through the antenna 7.

Thus, in the transmission device according to the present invention, a guard interval determined depending on the communications status between the transmission device and the reception device is inserted. For each of the signal series (Si, Sj) to be transmitted, the amplitude or the power of a transmission signal is adjusted corresponding to the respective length of the inserted guard interval.

FIG. 7 shows the configuration of a reception device according to an embodiment of the present invention. In this example, the reception device is assumed to receive a signal series Si from the radio signal transmitted from the transmission device shown in FIG. 6. The reception device corresponds to, for example, a mobile station in FIG. 5. In FIG. 7, the frequency synchronizing capability, the timing synchronizing capability, etc. required to receive a signal are omitted.

The signal received by the antenna 11 is converted into a baseband signal Srx by the receiver (RX) 12, and then converted into m received signal series by the subcarrier demodulator (FDEM: Frequency Demodulator) 13. The subcarrier demodulator 13 has m input terminals, and the same baseband signal Srx is input into the input terminal in parallel. The subcarrier demodulator 13 multiplies the baseband signal Srx by a periodic wave having the angular frequencies $\omega_1 \sim \omega_m$, thereby demodulating a signal for each subcarrier. The process of the subcarrier demodulator 13 is realized by, for example, a Fourier transform.

A guard interval deletion unit 31 deletes a guard interval from each of the received signal series at an instruction of a guard interval control unit (GCNTi) 32. The guard interval control unit 32 recognizes the length of the guard interval inserted for the signal series Si in the transmission device, and notifies the guard interval deletion unit 31 of the value. Therefore, the guard interval deletion unit 31 can appropriately remove the guard interval inserted in the transmission device.

The spread demodulator 15 multiplies each received signal series by the spreading code Ci which is the same as the spreading code used in the transmission device in order to perform an inverse spread. Then, by adding each signal output from the spread demodulator 15 using the adder 16, the signal series Si is regenerated.

Figure 8:
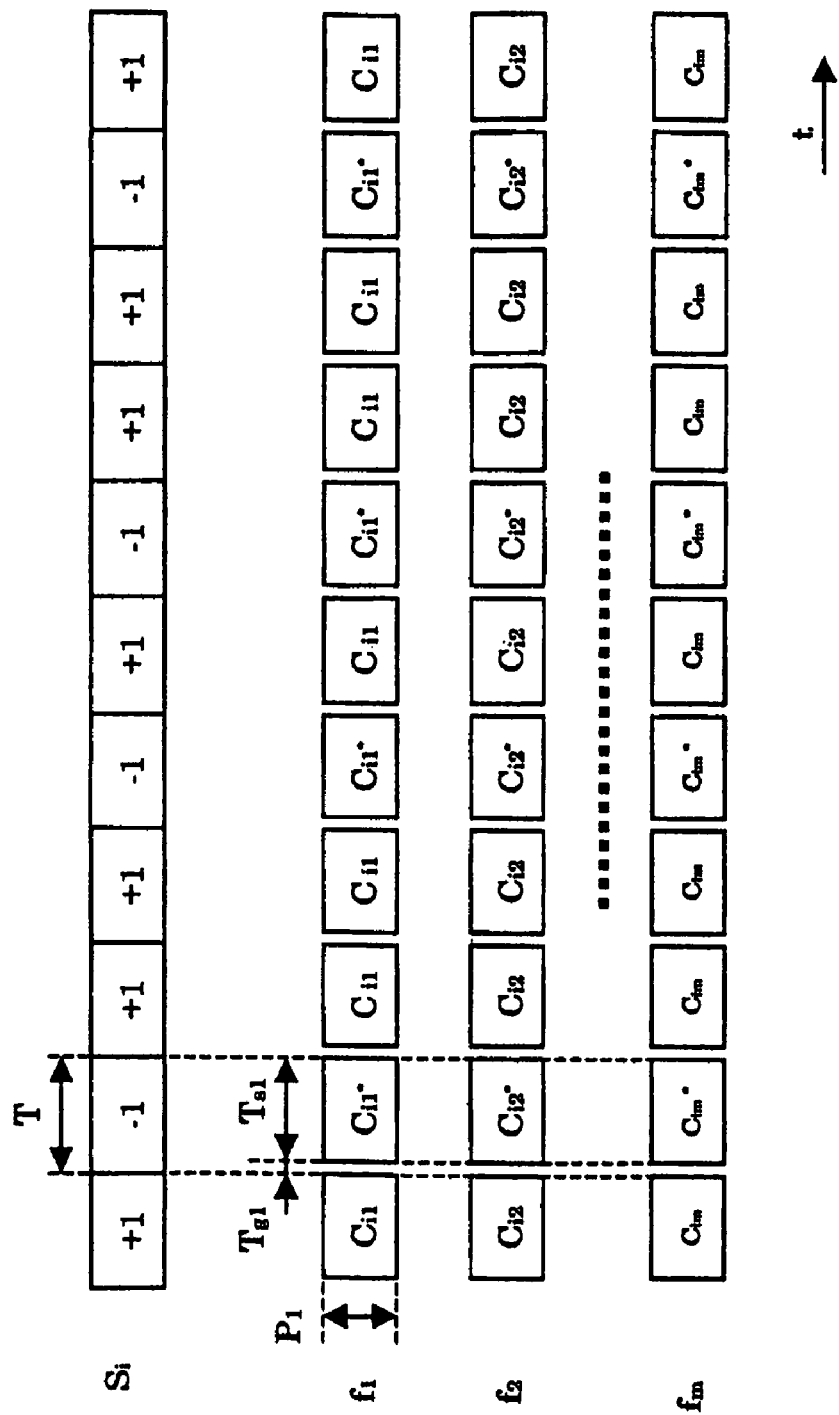
FIGS. 8 and 9 show examples of transmission signals in the OFDM transmission system according to an embodiment of the present invention.
Figure 9:
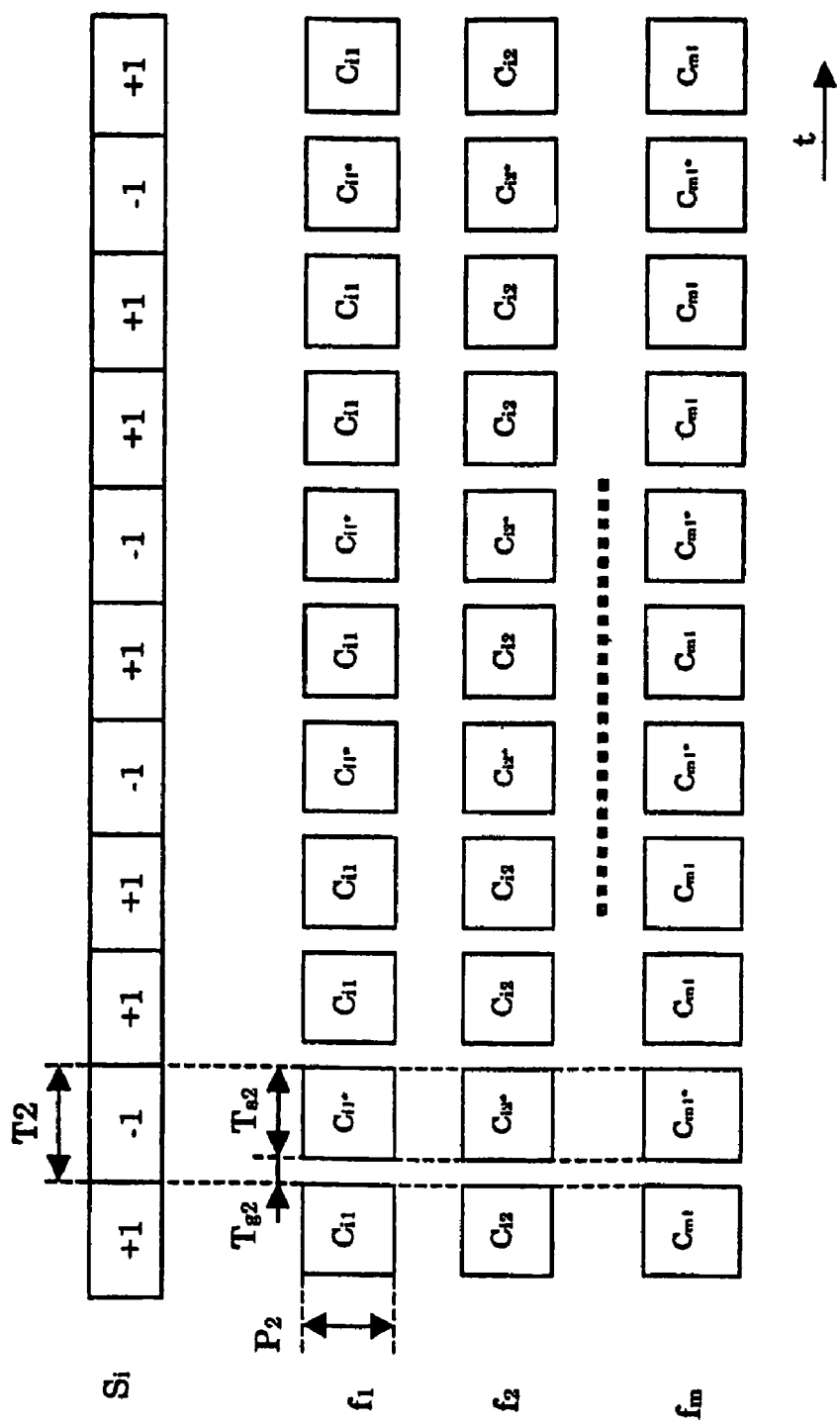

FIGS. 8 and 9 show examples of the transmission signals in the OFDM transmission system according to an embodiment of the present invention. FIG. 8 is a schematic diagram of a transmission signal to be transmitted to a mobile station (reception device) located where the maximum transmission delay difference is small, and FIG. 9 is a schematic diagram of a transmission signal to be transmitted to a mobile station (reception device) located where the maximum transmission delay difference is large. The symbol period of the transmission signal shown in FIG. 8 is "T1", and the symbol period of the transmission signal shown in FIG. 9 is "T2". The symbol periods can be the same with each other, or different from each other.

When a signal is transmitted to a mobile station located at a position in which the maximum transmission delay difference is small, a guard interval Tg1 is inserted into the symbol period T1 for each subcarrier as shown in FIG. 8. Therefore, the signal is transmitted using the section Ts1. On the other hand, when a signal is transmitted to a mobile station located at a position in which the maximum transmission delay difference is large, a guard interval Tg2 is inserted into the symbol period T2 for each subcarrier as shown in FIG. 9. Therefore, the signal is transmitted using the section Ts2. Here, the guard interval Tg1 is set shorter than the guard interval Tg2. That is to say, the length of the guard interval becomes correspondingly longer as the maximum transmission delay difference detected when a signal is transmitted from a transmission device to a reception device is larger.

When a signal is transmitted to a mobile station located at a position in which the maximum transmission delay difference is small, the transmission power of the signal is controlled to be "P1" as shown in FIG. 8. On the other hand, when a signal is transmitted to a mobile station located at a position in which the maximum transmission delay difference is large, the transmission power of the signal is controlled to be "P2" as shown in FIG. 9. Here, the power P2 is larger than the power P1. That is, the transmission power of the signal becomes correspondingly larger as the maximum transmission delay difference detected when a signal is transmitted from a transmission device to a reception device is larger.

Then, before explaining the insertion/deletion of a guard interval, a guard interval itself is briefly explained.

FIG. 10 is an explanatory view of a guard interval, and shows a schematic diagram of a waveform of a signal received by the reception device. The solid line "a" indicates the waveform of a signal (basic wave) first reaching the reception device, and the broken line "b" indicates the waveform of a delay signal (delay wave) reaching the reception device later. In FIG. 10, only one delay wave is drawn, but there are actually two or more delay waves.

In FIG. 10, before the time T1, since both of the basic wave and the delay wave are consecutive sine waves, the reception device can regenerate corresponding symbol information from the composite wave. However, when the symbol information changes from "+1" to "−1", or from "−1" to "+1", the phase of a signal for transmission of the symbol information shifts. In the example shown in FIG. 10, the phase of the basic wave shifts at the time T1, and the phase of the delay wave shifts at the time T2. That is, in this case, the period between the time T1 and the time T2, the basic wave transmits the information after the phase shift, and the delay wave transmits the information before the phase shift. Therefore, in this period, one signal wave can be an interference wave for the other signal wave, and symbol information may not be correctly regenerated from the received wave.

The above-mentioned influence of interference can be avoided in, for example, the example shown in FIG. 10 by not using the received wave between the time T1 and the time T2 for regenerating a signal from the received wave. In the OFDM transmission system, a predetermined period including this period is defined as a guard interval not to regenerate a signal in the reception device. Therefore, it is necessary to set the length of the guard interval larger than the delay difference (maximum transmission delay difference) between the first reaching signal wave and the last reaching delay wave.

However, as described above, the maximum transmission delay difference changes depending on the distance, etc. between the transmission device and the reception device. Therefore, in the communications system according to an embodiment of the present invention, the length of the guard interval is determined corresponding to the maximum transmission delay difference.

Next, the method of inserting a guard interval in the transmission device is explained. In this example, it is assumed that the process of the subcarrier modulator 2 shown in FIG. 6 is realized by an inverse Fourier transform.

Figure 11:
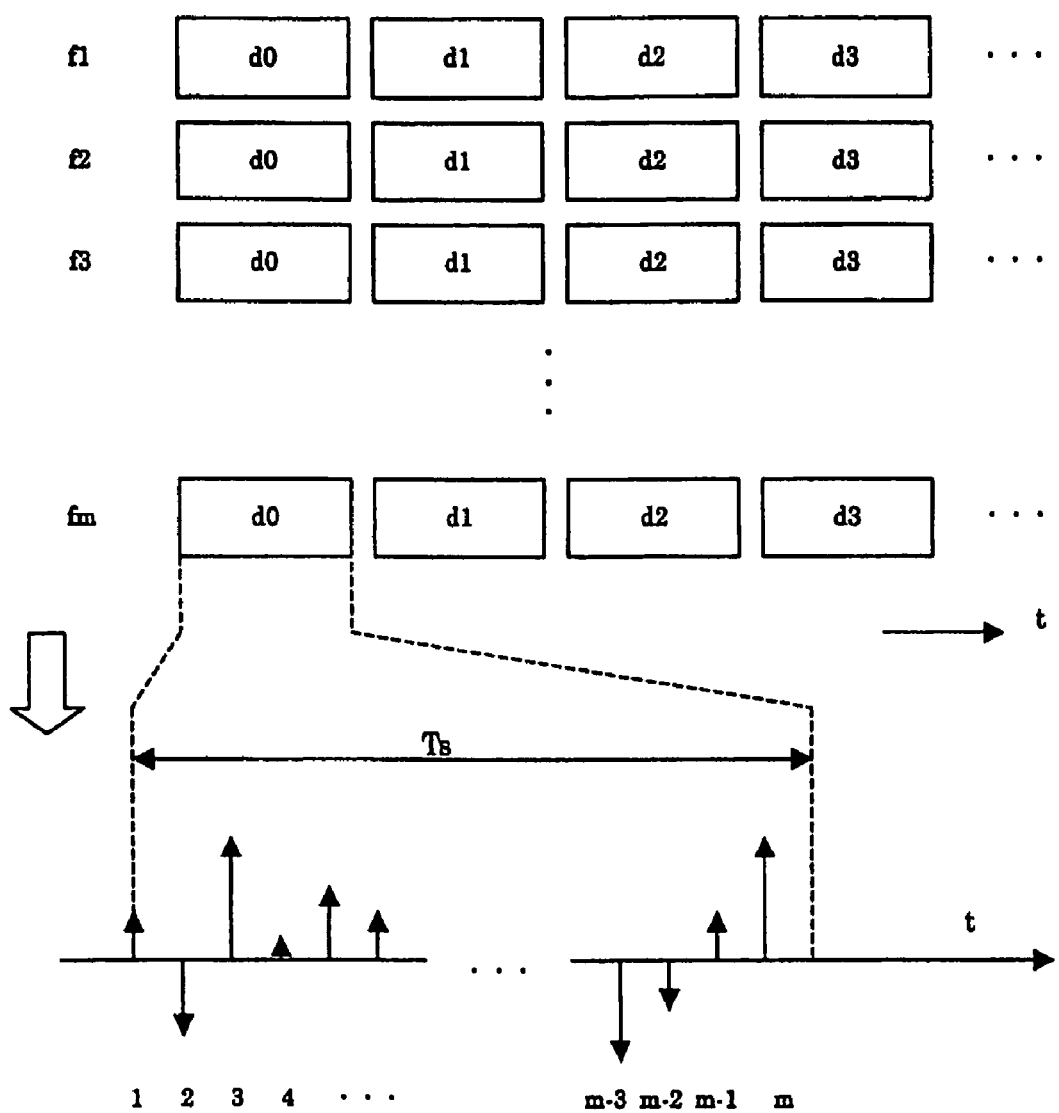
FIG. 11 is an explanatory view of an inverse Fourier transform performed by a subcarrier modulator.

FIG. 11 shows an inverse Fourier transform performed by the subcarrier modulator 2. In this process, "T" indicates a symbol period, "Tg" indicates a guard interval inserted in each symbol period, "Ts (=T−Tg)" indicates a signal time in each symbol period.

As described above, m pieces of information output from the spread modulator 1 are input to the subcarrier modulator 2. Each piece of information is assigned to the subcarrier with a corresponding frequency. That is, the subcarrier modulator 2 receives m signals arranged on the frequency axis. The m signals on the frequency axis are converted into a signal series configured by m samples on the time axis by an inverse Fourier transform performed in each symbol period T as shown in FIG. 11. At this time, m samples on the time axis are arranged in the signal time Ts.

FIG. 12 is an explanatory view showing the process of inserting a guard interval. Upon receipt of the m samples arranged in the signal time Ts, the guard interval insert unit 21 extracts corresponding number of sample elements, which is determined by the guard interval Tg, from the end of the signal time Ts, and duplicates them immediately before the signal time Ts. In the example shown in FIG. 12, the guard interval Tg corresponds to three sampling times, and "m−2" "m−1" "m" is extracted from m samples "1"~"m", and duplicated immediately before the signal time Ts. In the duplicating process, the signal series on the time axis of the symbol time (=Tg+Ts) is generated.

Figure 13:
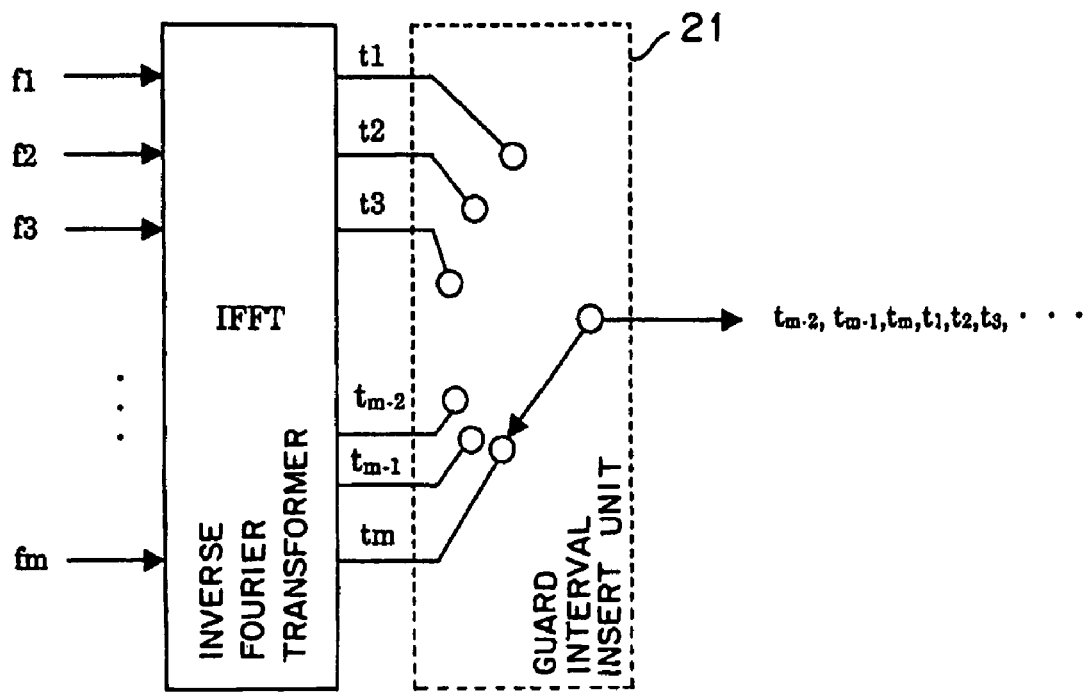
FIG. 13 shows an embodiment of the configuration for realizing a process of inserting a guard interval.

FIG. 13 shows an embodiment of the configuration for realizing the process of inserting a guard interval. As described above, the subcarrier modulator 2 is realized by an inverse Fourier transformer, and converts m signals on the frequency axis into m samples (t1~tm) on the time axis in each symbol period. Then, the guard interval insert unit 21 sequentially reads and outputs "tm−2" "tm−1" "tm" in the guard interval Tg, and in the subsequent signal time Ts, sequentially reads and outputs "t1"~"tm". Thus, a signal series into which guard intervals are inserted is generated.

With the above-mentioned configuration, the length of a guard interval is controlled by changing the "number of samples output before the signal time Ts". In this case, the read interval of a sample value is determined such that the guard interval Tg, the signal time Ts, and the period of the inverse Fourier transform (that is, the symbol period T) can satisfy predetermined relationship (T=Tg+Ts).

Described below is an example. In this example, it is assumed that the symbol period=T, the guard interval Tg=0.2 T, the signal time Ts=0.8 T, and the number of subcarriers to be multiplexed is "m=1000". In this case, 1000 samples (t1~t1000) are input into the guard interval insert unit 21 in each symbol period. Then, 250 (=1000×0.2÷0.8) samples (t751~t1000) are first read and output. Then, the 1000 samples (t1~t1000) are read and output. At this time, the read interval of the sample value is "T/1250". If the guard interval Tg=0.1 T, the signal time Ts=0.9 T, and the number of subcarriers "m=1000", then the guard interval insert unit 21 first reads and outputs 111 (=1000×0.1÷0.9) samples (t890~t1000), and subsequently reads and outputs the 1000 samples (t1~t1000). At this time, the read interval of the sample value is "T/1111".

In the embodiment of the present invention, a guard interval is inserted after a plurality of subcarriers are combined. However, in principle, a guard interval can be inserted for each subcarrier.

FIG. 14 shows an embodiment of the configuration to realize a process of deleting a guard interval from a received wave in the reception device. In this example, a signal series (tm−2, tm−1, tm, t1, t2, t3, . . . , tm) generated as shown in FIGS. 11 through 13 is received. In the reception device shown in FIG. 7, the guard interval is deleted after demodulating a subcarrier. However, with the configuration shown in FIG. 14, the processes are integrally performed.

The guard interval deletion unit 31 comprises a switch 41 a shift register 42. Upon receipt of signal series (tm−2, tm−1, tm, t1, t2, t3, . . . , tm), the guard interval deletion unit 31 appropriately turns ON or OFF the switch 41 to discard the predetermined number of sample values (in this example, tm−2, tm−1, tm) arranged in a guard interval, and the m subsequent sample values (t1~tm) are transmitted to the shift register 42. The guard interval deletion unit 31 recognizes the length of the guard interval inserted in the transmission device (or the number of samples in the guard interval) based on which the ON/OFF state of the switch 41 is controlled. On the other hand, when m sample values are accumulated in the shift register 42, a Fourier transformer functions as a subcarrier demodulator 13 performs a Fourier transform on the sample values, thereby obtaining the signals f1~fm for each subcarrier. This process is repeatedly performed in each symbol period T.

As described above, in the cellular communications system according to the embodiment of the present invention, when a signal is transmitted from a transmission device (base station) to a reception device (mobile station), the length of the guard interval and the transmission power are determined based on the maximum transmission delay difference between them. Here, when the distance between the transmission device and the reception device is short, the maximum transmission delay difference is small, and the guard interval is short. When the guard interval becomes short, the signal time taken to regenerate a signal in the reception device becomes longer. As a result, the transmission power can be smaller. Therefore, the interference power is reduced in the entire system, and the transmission capacity successfully increases.

Described below is an embodiment of the above-mentioned transmission device and the reception device.

First Embodiment

Figure 15:
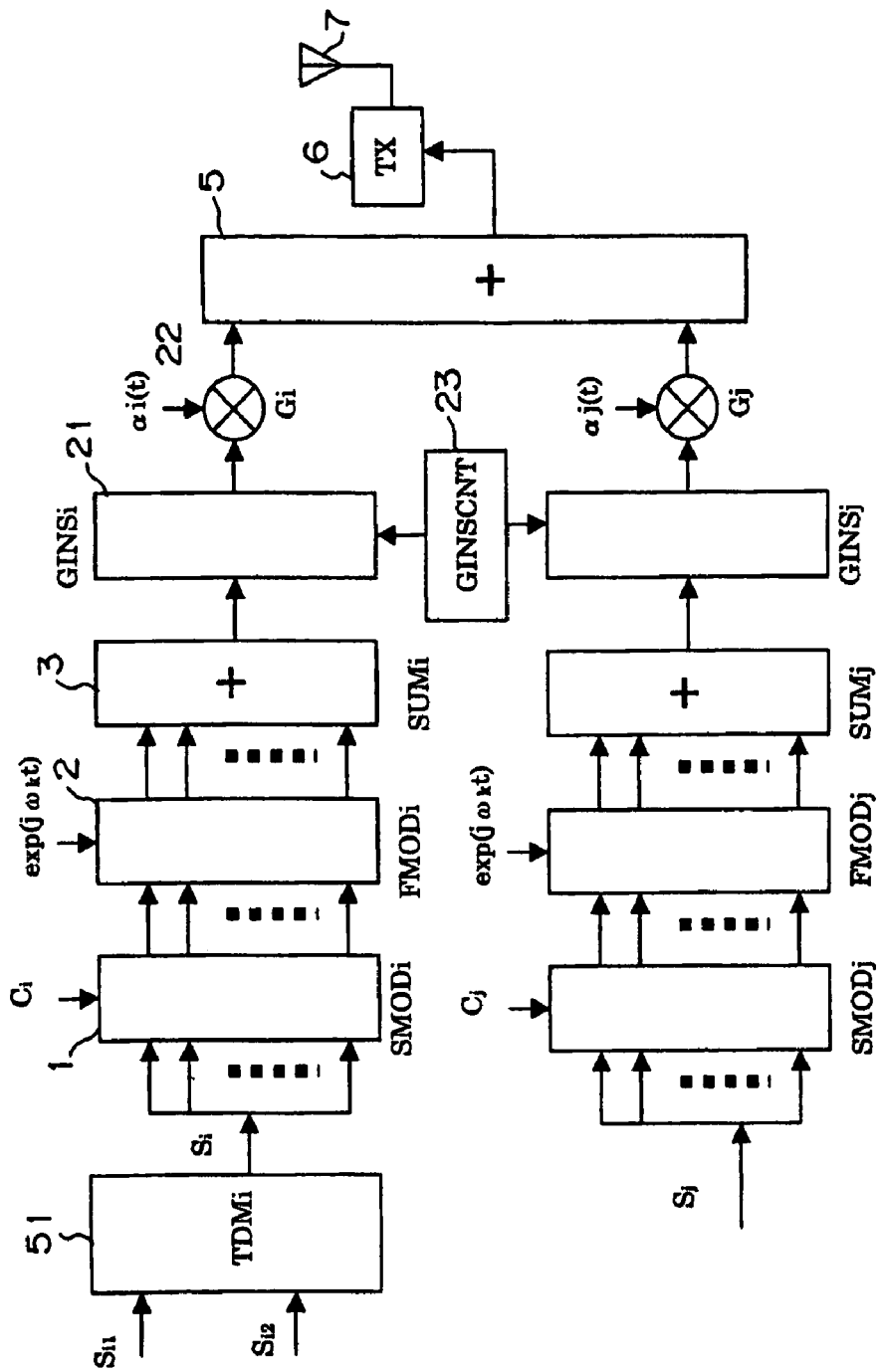
FIG. 15 shows the configuration of the transmission device according to the first embodiment of the present invention.
Figure 16:
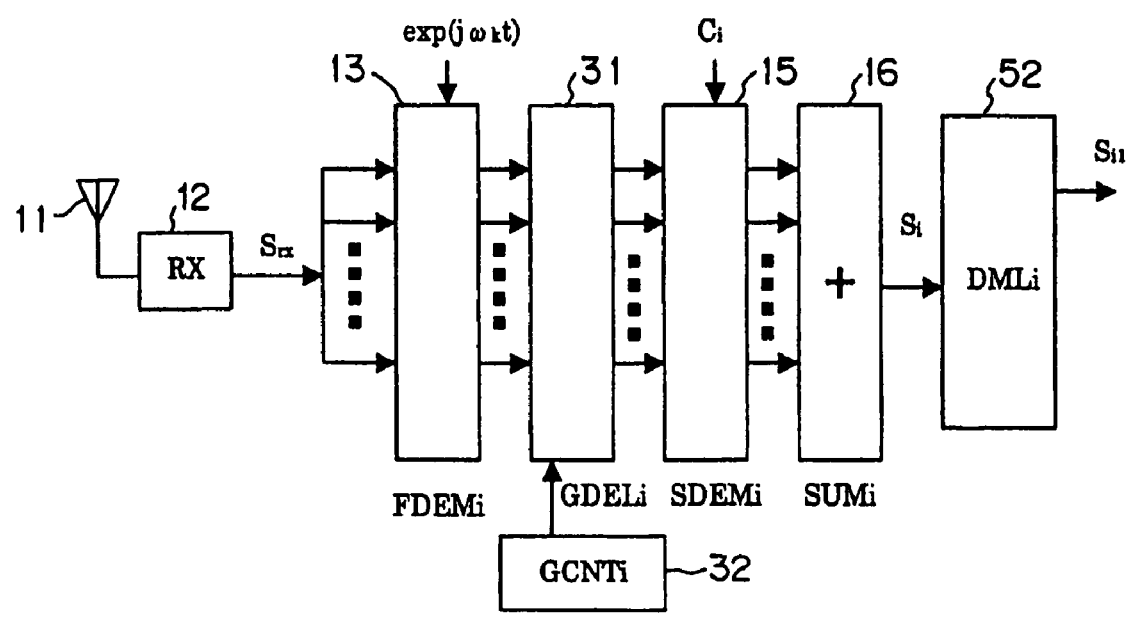
FIG. 16 shows the configuration of the reception device according to the first embodiment of the present invention.

FIGS. 15 and 16 show the configuration of the transmission device and the reception device according to the first embodiment. The basic configurations of the devices are the same as the transmission device shown in FIG. 6 and the reception device shown in FIG. 7. However, the transmission device according to the first embodiment can collectively modulate a plurality of time-division multiplexed signal series by one OFDM-CDM unit (the spread modulator 1, the subcarrier modulator 2, the adder 3, and the guard interval insert unit 21).

That is, the signal series Si1 and the signal series Si2 are multiplexed by a time-division multiplex unit (TDMi) 51 as shown in FIG. 17. In this example, these signal series are transmitted through communication links having different maximum transmission delay differences. These signal series are modulated by the spread modulator 1 and the subcarrier modulator 2, and then supplied to the guard interval insert unit 21.

The guard interval insert unit 21 inserts a guard interval wider than the corresponding maximum transmission delay difference into an input signal series. The guard interval for each signal series is set by the guard interval control unit 23. The gain adjuster 22 multiplies the transmission signal by a gain coefficient α determined depending on the inserted guard interval. Practically, in the example shown in FIG. 17, when a signal series Si1 is input, a guard interval Tg1 is inserted in each symbol period, and the gain coefficient $\alpha i(t)$ is controlled such that the transmission power of the signal can be "P1". On the other hand, when a signal series Si2 is input, a guard interval Tg2 is inserted in each symbol period, and the gain coefficient $\alpha i(t)$ is controlled such that the transmission power of the signal can be "P2".

The above-mentioned modulated signal is combined with a signal of another series, and is transmitted through the antenna 7.

The basic operation of the reception device is described above by referring to FIG. 7. However, this reception device regenerates only a signal addressed to the device itself. For example, when the signal series Si1 is regenerated from a signal obtained by time-division multiplexing the signal series Si1 and the signal series Si2, the guard interval control unit 32 issues an instruction to the guard interval deletion unit 31 to delete the guard interval Tg1 in the period in which the signal series Si1 is received. Then, at the instruction, the guard interval deletion unit 31 deletes a guard interval in each symbol period of the signal series Si1. At this time, in the period in which the signal series Si2 is received, a guard interval is not to be deleted.

The output of the guard interval deletion unit 31 is inverse spread demodulated by the spread demodulator 15. At this time, the spread demodulator 15 performs inverse spread demodulation on the signal time Ts1 in which the guard interval Tg1 is deleted. A demultiplexing unit (DML) 52 outputs data in a time slot corresponding to the signal series Si1 from the demodulated signal.

Thus, in the communications system according to the first embodiment of the present invention, a plurality of time-division multiplexed signal series can be collectively modulated by one OFDM-CDM unit (spread modulator 1, subcarrier modulator 2, adder 3, and guard interval insert unit 21).

Second Embodiment

The communications system according to the second embodiment of the present invention is a variation of the first embodiment of the communications system. That is, in the system according to the first embodiment, the time-division multiplexed signal series Si1 and signal series Si2 are transmitted using the OFDM-CDM. It is assumed that the signal series Si1 and signal series Si2 are transmitted to the corresponding mobile stations. On the other hand, in the system according to the second embodiment, the time-division multiplexed broadcast information Bi and signal series Si1 are transmitted using the OFDM-CDM. The signal series Si1 is transmitted to one or more reception devices, but the broadcast information Bi is transmitted to all reception devices (mobile stations) in the service area. Therefore, it is necessary that a guard interval is set and the transmission power is determined such that the broadcast information Bi can be appropriately transmitted to the reception device located farthest in the service area (that is, the reception device having the largest maximum transmission delay difference).

Figure 19:
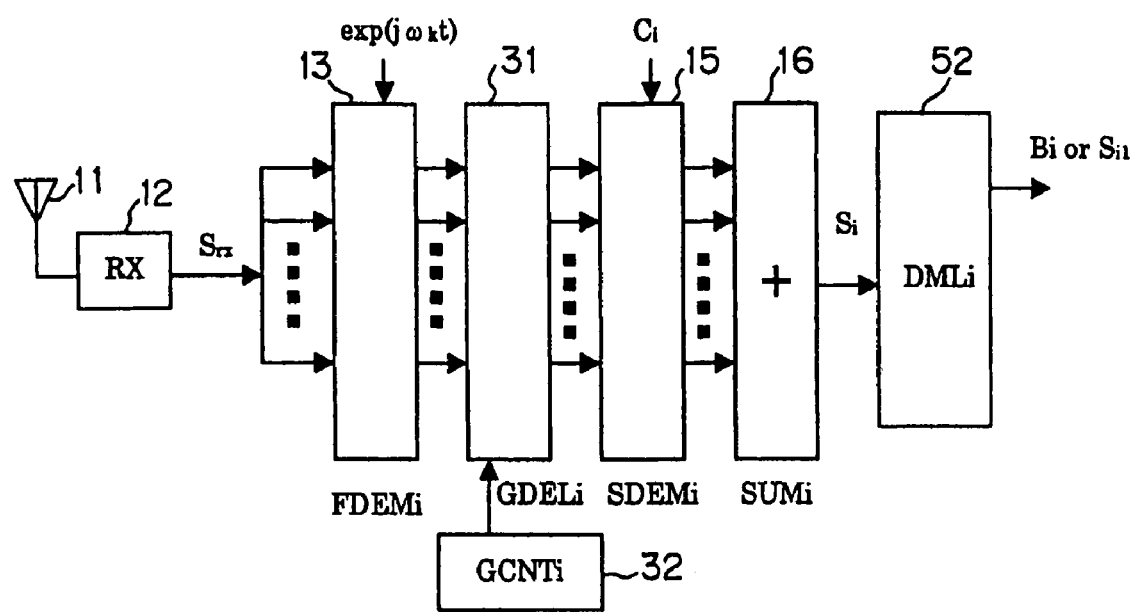
FIG. 19 shows the configuration of the reception device according to the second embodiment of the present invention.

FIGS. 18 and 19 show the configurations of the transmission device and the reception device according to the second embodiment of the present invention. The basic configuration of these devices are the same as the transmission device shown in FIG. 15, and the reception device shown in FIG. 16.

Figure 20:
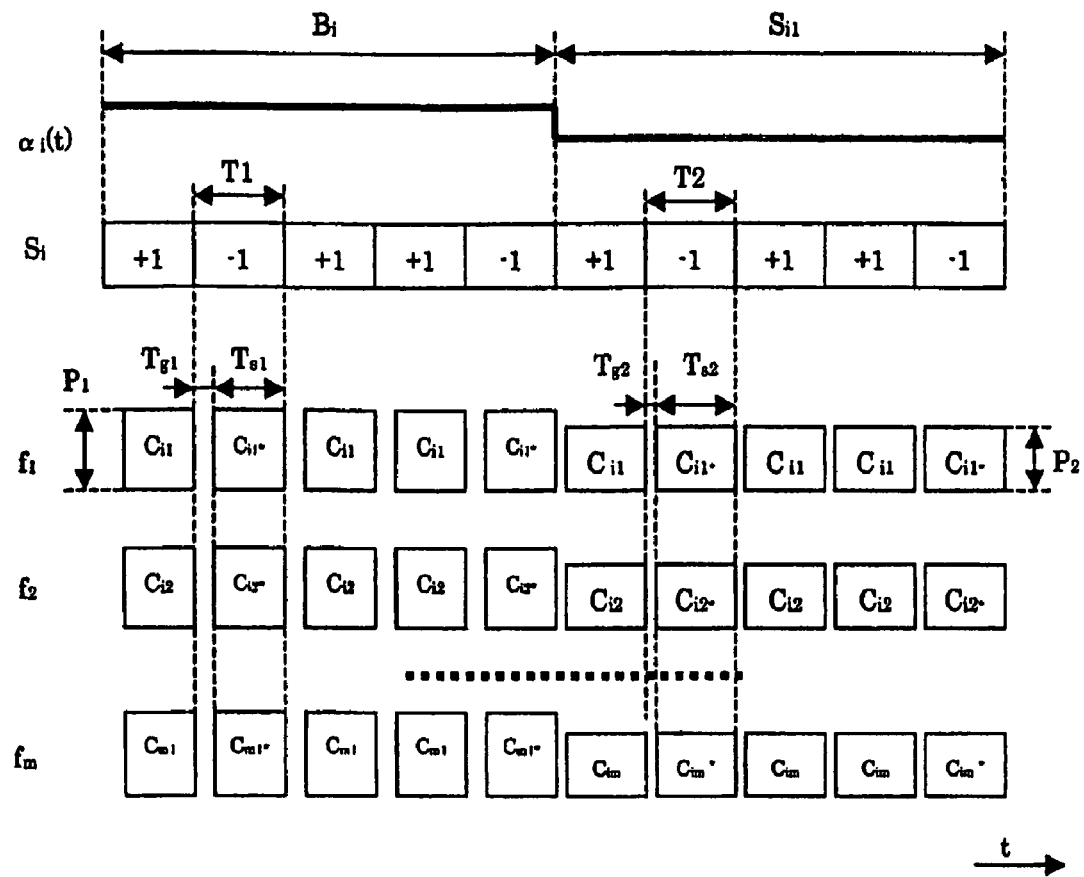
FIG. 20 is a schematic diagram of a transmission signal in the communications system according to the second embodiment of the present invention.

In the second example, the guard interval insert unit 21 inserts a guard interval Tg1 in each symbol period when broadcast information Bi is input, and inserts a guard interval Tg2 in each symbol period when signal series Si1 is input according to an instruction from the guard interval control unit 23 as shown in FIG. 20. The guard interval Tg1 inserted into the broadcast information Bi is set to be larger than the largest maximum transmission delay difference generated in the service area. For example, if the maximum transmission delay difference of the path from the base station to the mobile station MS3 is the largest when broadcast information is transmitted from the base station to the mobile stations MS1 through MS3 in FIG. 5, then the length of the guard interval Tg1 is set to be larger than the maximum transmission delay difference. On the other hand, the guard interval Tg2 inserted into the signal series Si1 is set to be larger than that maximum transmission delay difference of the path to the corresponding reception device. For example, when the signal series Si1 is transmitted from the base station to the mobile station MS1 in FIG. 5, the length of the guard interval Tg2 is set to be larger than the maximum transmission delay difference of the path from the base station to the MS1.

The gain adjuster 22 multiplies a transmission signal by the gain coefficient α depending on the guard interval inserted by the guard interval insert unit 21. Practically, in the example shown in FIG. 20, the gain coefficient $\alpha i(t)$ is controlled such that the transmission power of the signal for transmission of the broadcast information Bi can be "P1", and the transmission power of the signal for transmission of the signal series Si1 can be "P2". Therefore, by multiplying a transmission signal by the controlled gain coefficient α, the broadcast information Bi is transmitted with large transmission power so that it can be transmitted to all reception devices in the service area, and the signal series Si1 is transmitted with the smallest possible transmission power in the range of the corresponding reception devices.

In the reception device, the guard interval control unit 32 indicates the guard interval Tg1 in the period in which the broadcast information Bi is received, and indicates the guard interval Tg2 in the period in which the signal series Si1 is received. The guard interval deletion unit 31 deletes a guard interval from a received signal at an instruction from the guard interval control unit 32. Furthermore, a signal from which a guard interval is deleted is inverse spread by the spread demodulator 15, and then demultiplexed by the demultiplexing unit 52 into the broadcast information Bi and the signal series Si1.

The length of the guard interval Tg1 inserted into the broadcast information Bi is, for example, determined as follows.

(1) Determined based on the size of the communications area. That is, based on the size of the communications area covered by the transmission device, the delay time up to the reception device to which the broadcast information Bi last reaches with delay is estimated, and the length of the guard interval Tg1 is determined based on the delay time.

(2) Determined based on the transmission power of the transmission device when the broadcast information Bi is transmitted. That is, the maximum value of the transmission delay time when the broadcast information Bi is transmitted to a plurality of reception devices is estimated based on the transmission power of the broadcast information Bi, and the length of the guard interval Tg1 is determined according to the delay time.

(3) Determined based on the communications environments with a plurality of reception devices in the communications area. That is, the communications environment relative to each of a plurality of reception devices in the communications area covered by the transmission device is obtained, based on which the length of the guard interval Tg1 is determined. Practically, the length of the guard interval Tg1 is determined depending on the reception device having the worst communications environment.

(4) Determined based on the maximum delay time in the communications area. That is, the delay time when the broadcast information Bi is transmitted from the transmission device to a plurality of reception devices in the communications area is measured for each reception device, and the length of the guard interval Tg1 is determined based on the maximum delay time in the measurement results.

Third Embodiment

In the communications system according to the third embodiment of the present invention, the maximum transmission delay difference when a signal is transmitted from the transmission device to the reception device is detected, and the guard interval and the transmission power are determined based on the detection result. To attain this, the transmission device and the reception device in the third embodiment have the necessary capabilities.

FIG. 21 shows the configuration of the transmission device according to the third embodiment of the present invention. The transmission device receives the maximum transmission delay difference information (τ) indicating the maximum transmission delay difference detected in the corresponding reception device, and has the function of determining the guard interval and the transmission power according to the information. That is, a guard interval control unit (GINSCNT) 61 determines the length of the guard interval to be inserted based on the maximum transmission delay difference detected in the corresponding reception device. Practically, a guard interval control unit 61*i* determines the guard interval to be inserted into a signal for transmission of the signal series Si1 and/or the signal series Si2 according to the maximum transmission delay difference information (τi) transmitted from the reception device which receives the signal series Si1 and/or the signal series Si2. A power control unit (PCNT) 62 determines a gain coefficient α based on the maximum transmission delay difference detected in the corresponding reception device. Practically, a power control unit 62*i* determines the gain coefficient α by which the signal for transmission of the signal series Si1 and/or the signal series Si2 is to be multiplied according to the maximum transmission delay difference information (τi) transmitted from the reception device which receives the signal series Si1 and/or the signal series Si2.

The guard interval insert unit 21 inserts the guard interval determined by the guard interval control unit 61 into a transmission signal in each symbol period. The gain adjuster 22 realizes the transmission power corresponding to the length of the guard interval by multiplying a transmission signal by the gain coefficient α determined by the power control unit 62.

Figure 22:
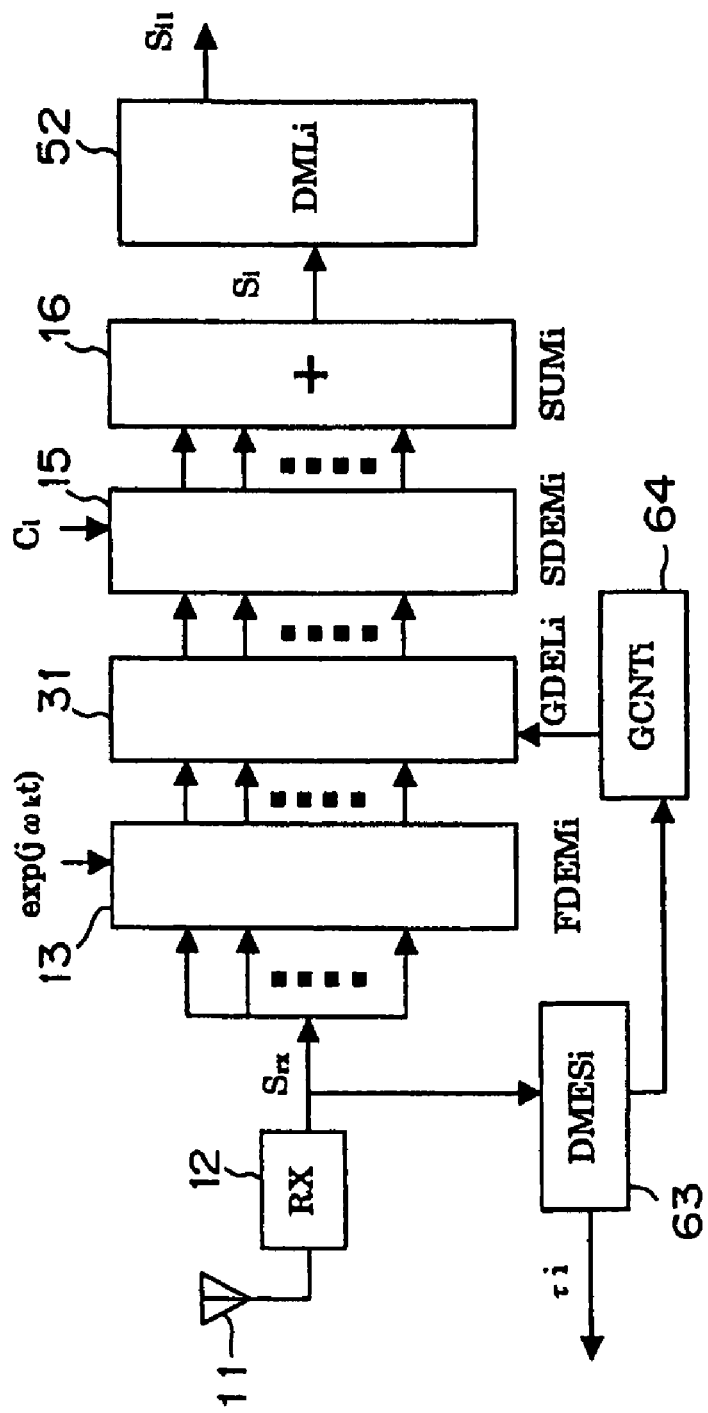
FIG. 22 shows the configuration of the reception device according to the third embodiment of the present invention.

FIG. 22 shows the configuration of the reception device according to the third embodiment of the present invention. The reception device has the function of detecting the maximum transmission delay difference of the signal transmitted from the transmission device. That is, a delay difference detection unit (DMES) 63 detects the maximum transmission delay difference from the received baseband signal Srx, and notifies a guard interval control unit 64 and the corresponding transmission device of the maximum transmission delay difference information indicating the detection result. The guard interval control unit 64 determines the guard interval according to the notification from the delay difference detection unit 63, and indicates it to the guard interval deletion unit 31. The guard interval deletion unit 31 deletes the guard interval from the radio signal according to the indication.

Figure 23:
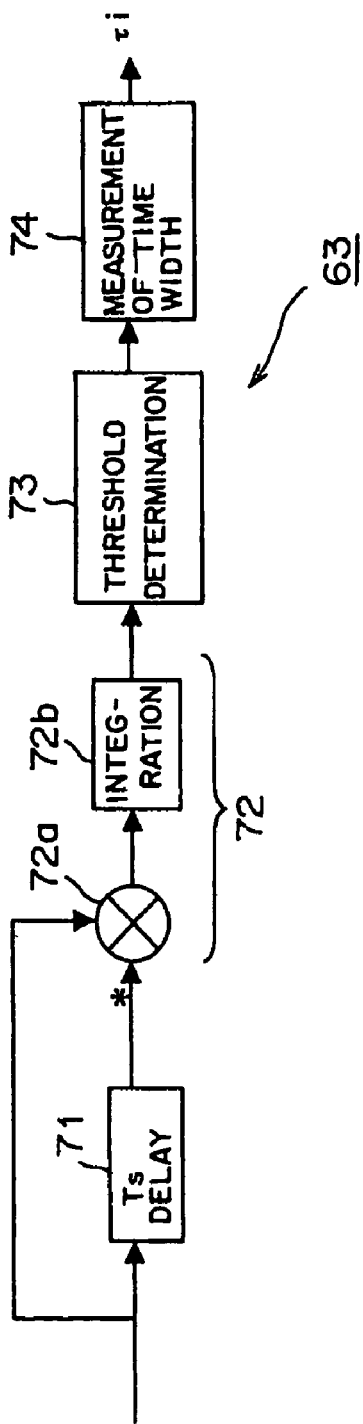
FIG. 23 shows the configuration of an example of a delay difference detection unit shown in FIG. 22.

FIG. 23 shows the configuration of an example of the delay difference detection unit 63 shown in FIG. 22. The delay difference detection unit 63 comprises: a delay circuit 71 for delaying the baseband signal Srx by the time Ts; a correlation detection circuit 72 including a multiplier 72*a* and an integrator 72*b*; a comparison circuit 73 for comparing the correlation value detected by the correlation detection circuit 72 with a predetermined threshold; and a detection circuit 74 for detecting the maximum transmission delay difference based on the comparison result from the comparison circuit 73. The multiplier 72*a* multiplies the baseband signal Srx by the delay signal. The integrator 72*b* integrates the output of the multiplier 72*a*. The operation of the delay difference detection unit 63 is explained by referring to FIG. 24.

Figure 25:
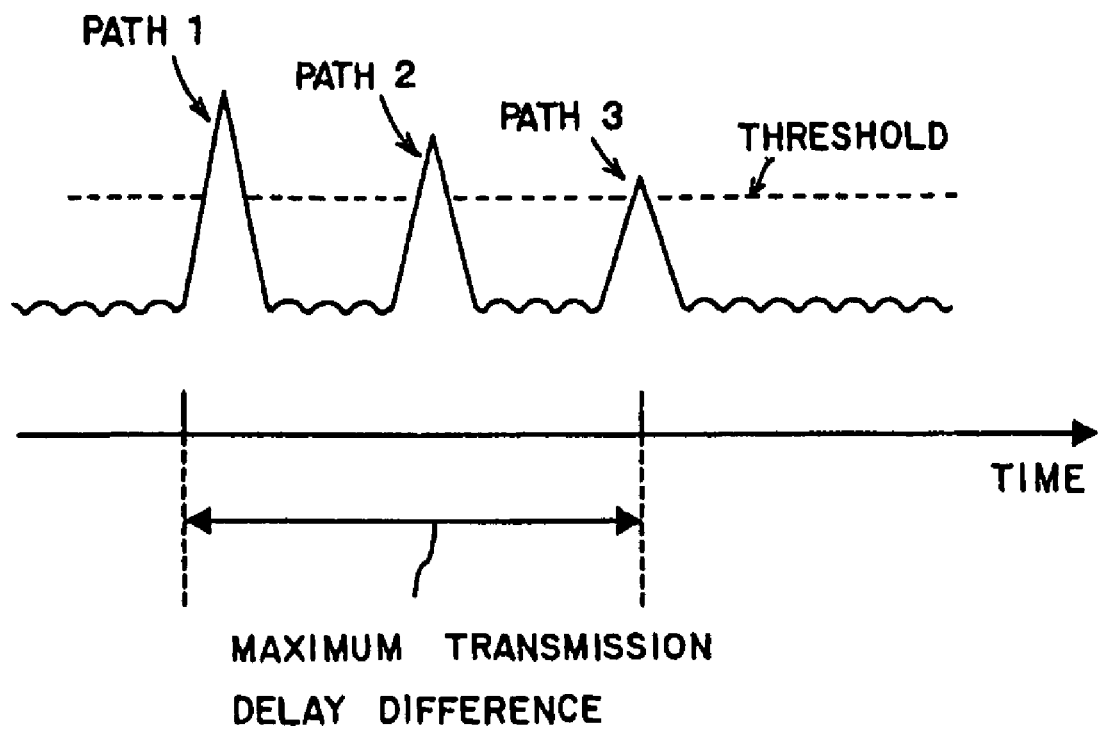
FIG. 25 shows an example of detecting the maximum transmission delay difference.

The baseband signal Srx and a signal (delay signal) obtained by delaying the baseband signal Srx by the time Ts are input to the correlation detection circuit 72. In the guard interval Tg in each symbol period, a sample value in the tailing portion of the signal time Ts is duplicated as described above by referring to FIGS. 11 through 13. Therefore, between the baseband signal Srx and its delay signal, the correlation (self-correlation) is enhanced when the tailing portion of the baseband signal Srx overlaps the guard interval of the delay signal. However, when there are a plurality of paths having different transmission delays between the transmission device and the reception device, the peak of the correlation value occurs each time a signal is received through each link. Therefore, when the correlation value is compared with the predetermined threshold by the comparison circuit 73, a timing at which a signal is received through each path can be detected. Therefore, the maximum transmission delay difference is detected by measuring the time difference between the timing with which the first signal is received and the timing with which the last signal is received. For example, in the communications environment shown in FIG. 4, the maximum transmission delay difference is detected as shown in FIG. 25.

Thus, in the third embodiment, the maximum transmission delay difference of the path between the transmission device and the reception device is measured, and a guard interval is inserted/deleted based on the measurement result. Therefore, the width of the guard interval can be dynamically changed. Furthermore, since the gain coefficient of a transmission signal is determined based on the measurement result of the maximum transmission delay difference, the transmission power can be constantly reduced to the smallest possible value.

Fourth Embodiment

In the communications system according to the fourth embodiment of the present invention, the transmission distance between the transmission device and the reception device is estimated, and the guard interval and the transmission power are determined based on the estimation result. Therefore, the transmission device and the reception device according to the fourth embodiment of the present invention has the capabilities to attain the above-mentioned objective.

Figure 26:
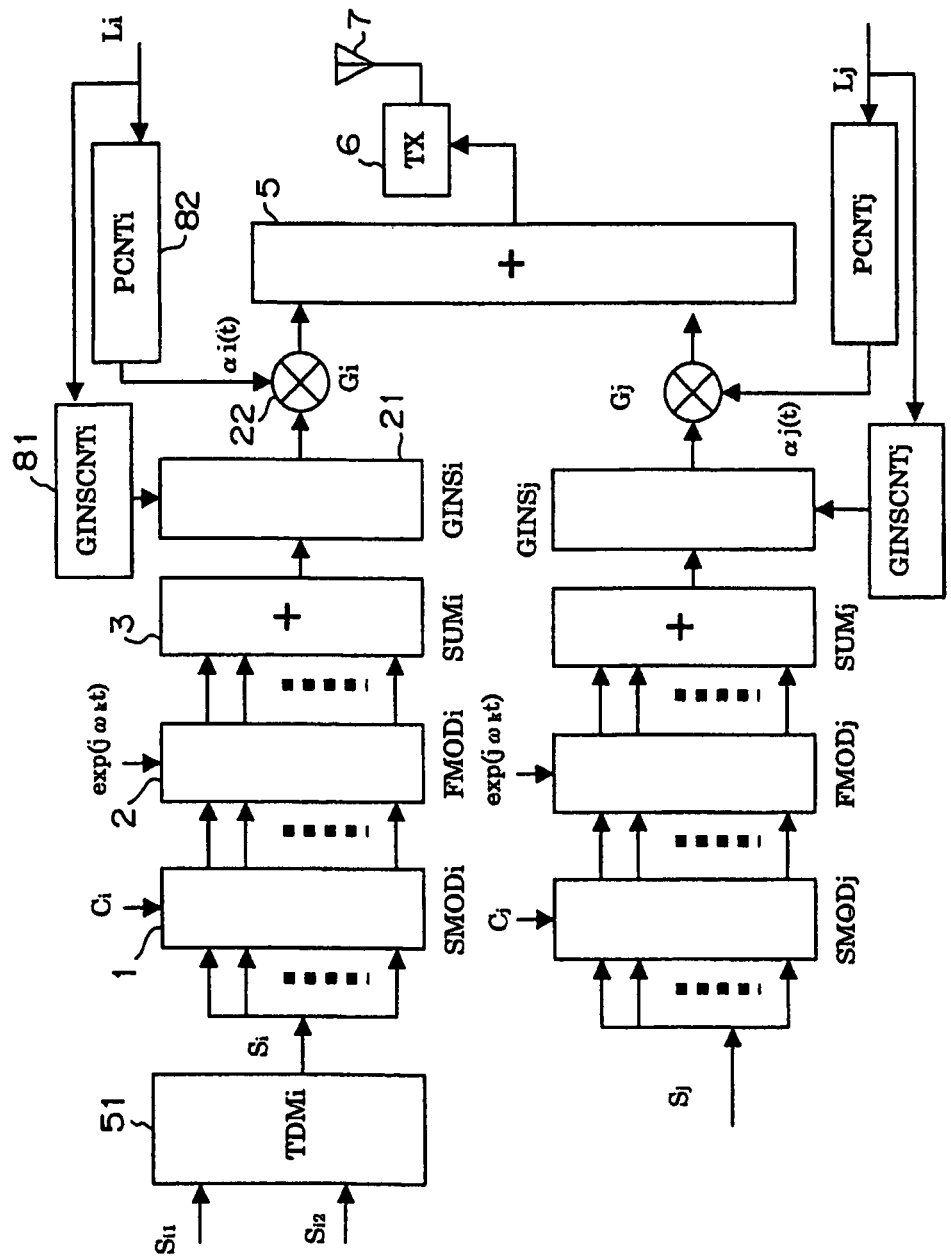
FIG. 26 shows the configuration of the transmission device according to the fourth embodiment of the present invention.

FIG. 26 shows the configuration of the transmission device according to the fourth embodiment of the present invention. The transmission device has the function of receiving the transmission distance information (L) indicating the estimated value of the transmission distance to the corresponding reception device, and determining the guard interval and the transmission power according to the information. That is, a guard interval control unit (GINSCNT) 81 determines the length of the guard interval to be inserted based on the transmission distance between the transmission device and the reception device. Practically, a guard interval control unit 81i determines the guard interval to be inserted into a signal for transmission of the signal series Si1 and/or the signal series Si2 according to the transmission distance information (Li) transmitted from the reception device which receives the signal series Si1 and/or the signal series Si2. A power control unit (PCNT) 82 determines the gain coefficient α based on the above-mentioned transmission distance. Practically, a power adjustment unit 82i determines the gain coefficient α by which a signal for transmission of the signal series Si1 and/or the signal series Si2 is multiplied according to the transmission distance information (Li) transmitted from the reception device which receives the signal series Si1 and/or the signal series Si2.

Then, the guard interval insert unit 21 inserts a guard interval determined by the guard interval control unit 81 into a transmission signal in each symbol period. Furthermore, the gain adjuster 22 realizes the transmission power corresponding to the length of the guard interval by multiplying a transmission signal by the gain coefficient α determined by the power control unit 82.

Figure 27:
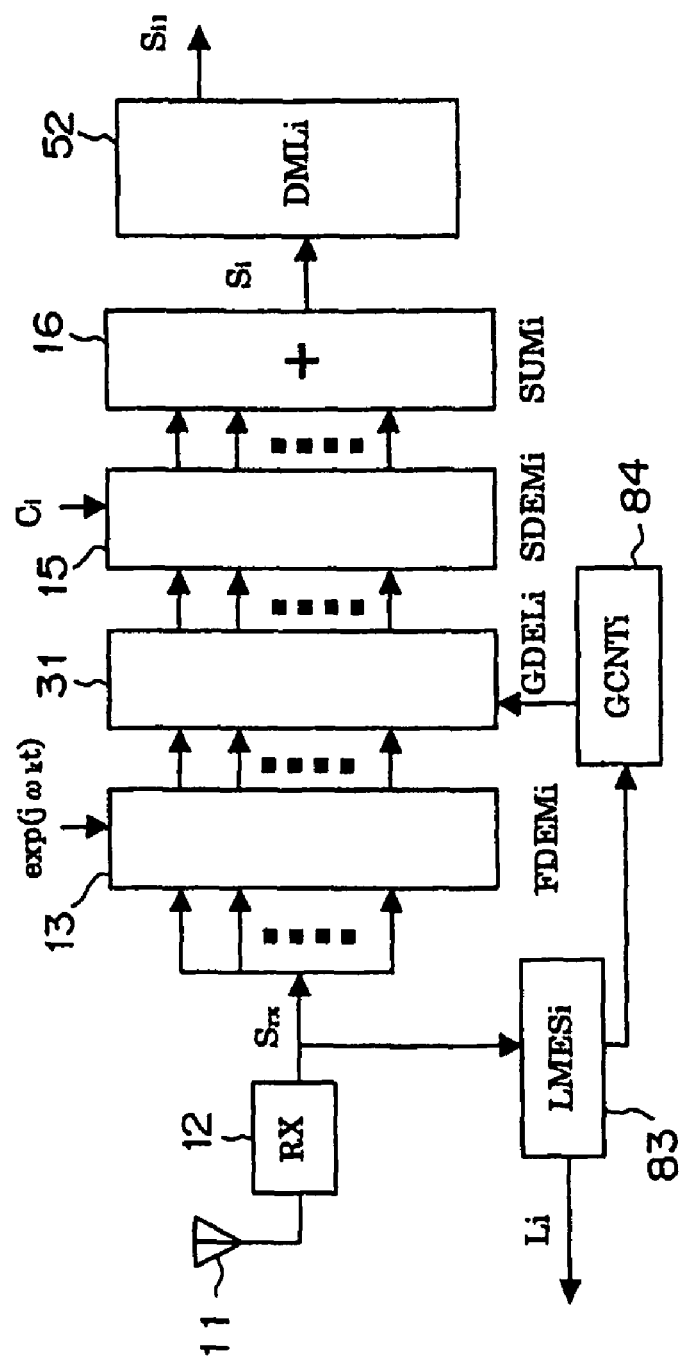
FIG. 27 shows the configuration of the reception device according to the fourth embodiment of the present invention.

FIG. 27 shows the configuration of the reception device according to the fourth embodiment of the present invention. The reception device has the function of estimating the transmission distance between the transmission device and the reception device. That is, a distance estimation unit (IMES) 83 estimates the transmission distance between the transmission device and the reception device according to the received baseband signal Srx, and the transmission distance information L indicating the estimation result is transmitted to a guard interval control unit 84 and the corresponding transmission device. The guard interval control unit 84 determines the guard interval according to the notification from the distance estimation unit 83, and indicates it to the guard interval deletion unit 31. The guard interval deletion unit 31 deletes the guard interval from the received signal based on the indication.

FIG. 28 shows the configuration of an example of the distance estimation unit 83 shown in FIG. 27. The distance estimation unit 83 comprises the delay difference detection unit 63 and a conversion table 85 explained above by referring to the third embodiment.

The distance between the transmission device and the reception device is relative to the maximum transmission delay difference of the communication link between them. The longer the transmission distance, the larger the maximum transmission delay difference. Thus, the transmission distance can be estimated by detecting the maximum transmission delay difference if the relationship between them is obtained in an experiment, a simulation, etc. Therefore, the information about the relationship between the transmission distance and the maximum transmission delay difference is stored in the conversion table 85 of the distance estimation unit 83. Then, the transmission distance between the transmission device and the reception device is estimated by retrieving the conversion table 85 using the maximum transmission delay difference detected by the delay difference detection unit 63 as a key.

Fifth Embodiment

In the communications system according to the fifth embodiment of the present invention, as in the fourth embodiment, the transmission distance between the transmission device and the reception device is estimated, and the guard interval and the transmission power are determined based on the estimation result. However, the estimating method according to the fifth embodiment is different from the method according to the fourth embodiment.

Figure 29:
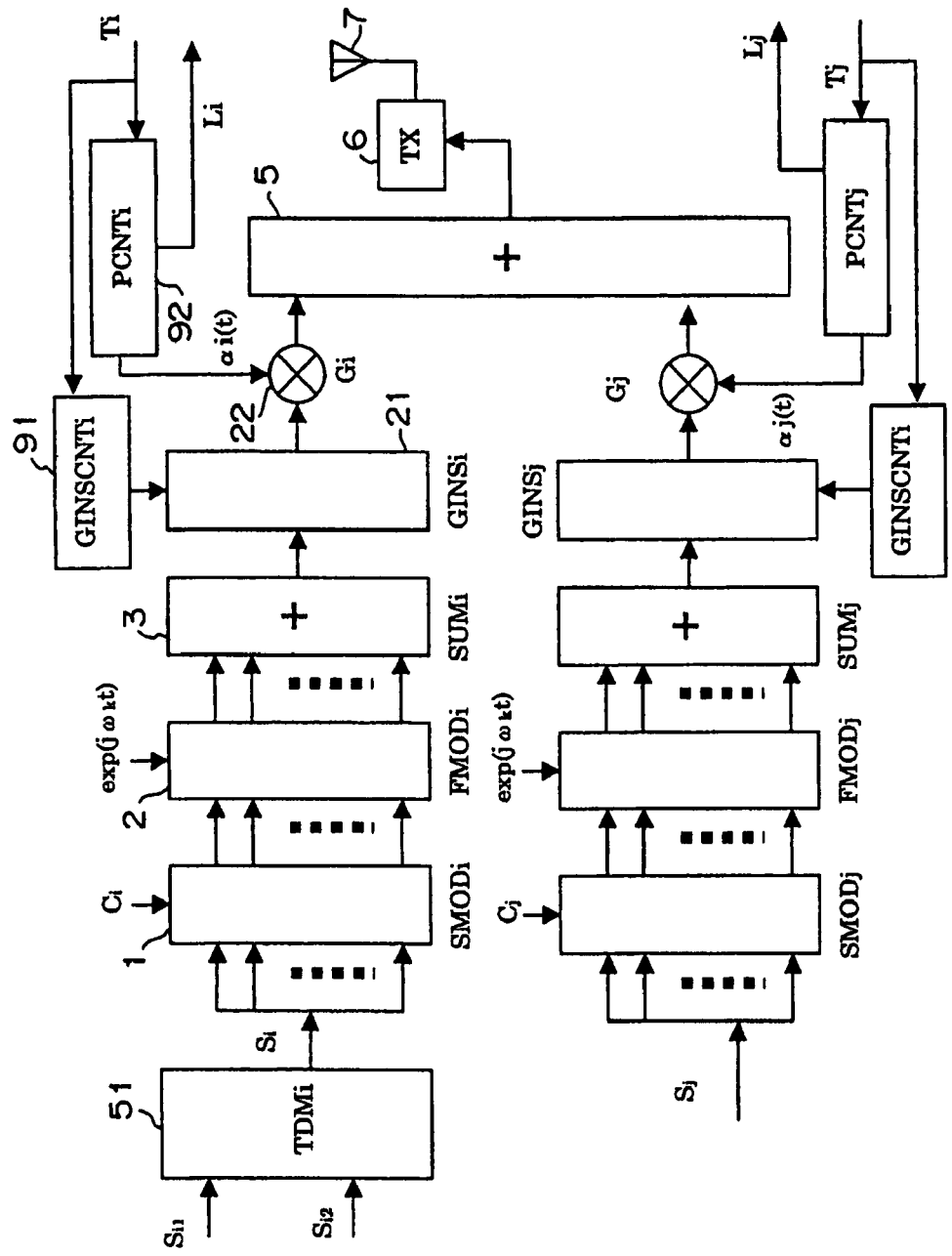
FIG. 29 shows the configuration of the transmission device according to the fifth embodiment of the present invention.

FIG. 29 shows the configuration of the transmission device according to the fifth embodiment of the present invention. The transmission device has the function of receiving timing information (T) from the corresponding reception device and estimating the transmission distance between the transmission device and the reception device according to the received information, and the function of determining the guard interval and the transmission power based on the estimated value of the transmission distance.

A guard interval control unit (GINSCNT) 91 or a power control unit (PCNT) 92 estimates the distance between the transmission device and the corresponding reception device according to the timing signal T transmitted from the corresponding reception device. That is, in the fifth embodiment, a signal is transmitted from the transmission device, the signal is detected by the corresponding reception device, and the information about the signal detected in the reception device is returned to the transmission device. The timing at which the signal is detected by the reception device is informed to the transmission device using the timing information T. Therefore, if the guard interval control unit 91 or the power control unit 92 monitors the time from when the signal is transmitted to the reception device until when the timing information T is returned from the corresponding reception device, it can estimate the transmission time and the transmission distance between the transmission device and the reception device. The estimated value of the transmission distance is informed to the corresponding reception device using the transmission distance information L.

The guard interval control unit 91 determines the length of the guard interval based on the estimated value of a transmission distance. The power control unit 92 determines the gain coefficient α based on the estimated value of a transmission distance. These processes are the same as those according to the fourth embodiment.

FIG. 30 shows the configuration of the reception device according to the fifth embodiment of the present invention. The reception device has the function of detecting the reception timing of a signal transmitted by the transmission device. That is, a timing generation unit (TGEN) 93 detects a reception timing based on the received baseband signal Srx, and generates a timing signal T. Then, the generated timing signal T is transmitted to the transmission device. Furthermore, a guard interval control unit (GCNT) 94 determines the guard interval according to the transmission distance information L from the transmission device, and indicates it to the guard interval deletion unit 31. The guard interval deletion unit 31 deletes the guard interval from the received signal according to the indication.

Figure 31:
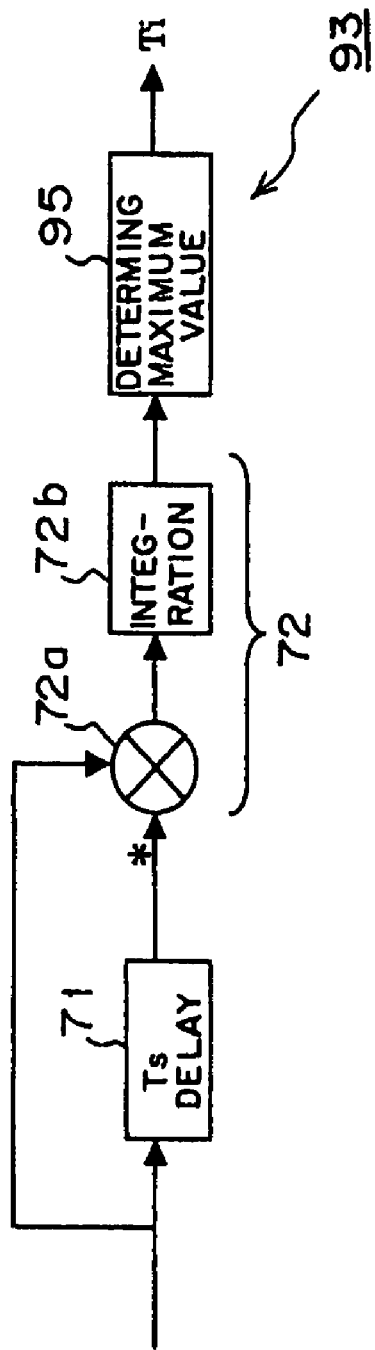
FIG. 31 shows the configuration of an example of the timing generation unit shown in FIG. 30.

FIG. 31 shows the configuration of an example of the timing generation unit 93 shown in FIG. 30. The timing generation unit 93 comprises the delay circuit 71 and the correlation detection circuit 72 described above by referring to the third embodiment, and a maximum value determination circuit 95.

When the correlation between the radio signal and its delay signal is monitored as described above, the correlation value of the period in which the guard interval is received is higher. Practically, by detecting the maximum value of the correlation value in each symbol period using the maximum value determination circuit 95, the timing of the guard interval (or the timing corresponding to the moment immediately after the guard interval) can be detected. The timing generation unit 93 generates the timing information T indicating the detected timing, and transmits it to the transmission device.

Sixth Embodiment

The communications system according to the sixth embodiment estimates the transmission distance between the transmission device and the reception device, and the guard interval and the transmission power are determined based on the estimation result. However, the estimating method of the sixth embodiment is different from the methods of the fourth or fifth embodiment.

In the communications system according to the sixth embodiment, when the signal series Si1 and the signal series Si2 are transmitted, each signal series is time-division multiplexed with the known information SW. On the other hand, when the reception device detects the known information SW contained in a received signal, it notifies the transmission device of the detection timing. Then, the transmission device detects the transmission time of the signal between the transmission device and the reception device according to the timing at which the known information SW is transmitted and the timing information transmitted from the reception device, and estimates the transmission distance based on the transmission time.

FIG. 32 shows the configuration of the transmission device according to the sixth embodiment. The transmission device has the function of multiplexing a transmission signal series with the known information SW, the function of receiving timing information (T) from the corresponding reception device and estimating the transmission distance between the transmission device and the reception device according to the received information, and the function of determining the guard interval and the transmission power based on the estimated value of the transmission distance.

When the time-division multiplex unit 51 transmits the signal series Si1 and Si2, it multiplexes the signal series with the known information SW. The known information SW is not specified, but it is necessary for the corresponding reception device to recognize the data pattern.

A guard interval control unit (GINSCNT) 101 or a power control unit (PCNT) 102 estimates the distance between the transmission device and the corresponding reception device according to the timing signal T transmitted from the corresponding reception device. The estimated value of the transmission distance is informed to the corresponding reception device using the transmission distance information L. The method of estimating the transmission distance is described later.

The guard interval control unit 101 determines the length of a guard interval based on the estimated value of the transmission distance. The power control unit 102 determines the gain coefficient α based on the estimated value of the transmission distance. These processes are basically the same as those according to the fourth or the fifth embodiment.

FIG. 33 shows the configuration of the reception device according to the sixth embodiment. The reception device has the function of demultiplexing the known information SW from a received wave, and the function of notifying the transmission device of the information about the reception of the known information. That is, When a timing generation unit 103 (TGEN) detects the known information SW output from the demultiplexing unit (DML) 52, it generates a timing signal if a predetermined time has passed after the detection timing, and transmits it to the transmission device. A guard interval control unit (GCNT) 104 determines the guard interval according to the transmission distance information L transmitted from the transmission device, and indicates it to the guard interval deletion unit 31. Then, the guard interval deletion unit 31 deletes the guard interval from the received signal according to the indication.

FIG. 34 shows the configuration of an example of the timing generation unit 103 shown in FIG. 33. A signal series demodulated by the reception device is input to the timing generation unit 103. Here, this signal series includes the known information SW inserted by the transmission device. The signal series are sequentially input to a shift register 105 having the word length equal to that of the known information SW. Each time new data is written to the shift register 105, a logic inversion circuit 106, an addition circuit 107, and a comparison circuit 108 check whether or not the stored data matches the known information SW. The logic inversion circuit 106 is provided corresponding to the word pattern of the known information SW. The addition circuit 107 adds up the value of each element stored in the shift register 105 or the logic inverted value of each element stored in the shift register 105. Then, the comparison circuit 108 compares the addition result by the addition circuit 107 with a predetermined threshold, and outputs a timing signal T when the addition result is larger.

Thus, in the communications system according to the sixth embodiment, the known information SW is transmitted from the transmission device to the reception device, and the information about the reception of the known information SW is informed from the transmission device to the reception device. Therefore, assuming that "T1" indicates the transmission time when a signal is transmitted from the transmission device to the reception device, "Td" indicates the time from the detection of the known information SW by the reception device to the transmission of the timing information; "T2" indicates the transmission time when timing information is transmitted from the reception device to the transmission device, and "T0" indicates the time from the transmission of the known information SW to the reception of the timing information, the following equation holds. It is assumed that "T2" is proportional to "T1", and "β" indicates the proportionality constant.

$$T1 = T0 - Td - T2$$
$$= T0 - Td - \beta \cdot T1$$

Therefore, $$T1 = (T0 - Td)/(1+\beta)$$

where the transmission distance between the transmission device and the reception device is proportional to the transmission time (T1) when a signal is transmitted from the transmission device to the reception device. The time (Td) from the detection of the known information SW by the reception device to the transmission of the timing information is known. Therefore, by measuring the time (T0) from the transmission of the known information SW to the reception of the timing information, the transmission device can estimate the transmission distance between the transmission device and the reception device. In this embodiment, the guard interval control unit 101 or the power control unit 102 estimates the transmission distance.

Seventh Embodiment

In the communications system according to the seventh embodiment of the present invention, the transmission error rate is measured while changing the guard interval, and the length of the guard interval (and the transmission power) is determined such that predetermined communications quality can be reserved. Therefore, the transmission device and the reception device according to the seventh embodiment have the functions to attain the above-mentioned objective.

Figure 35:
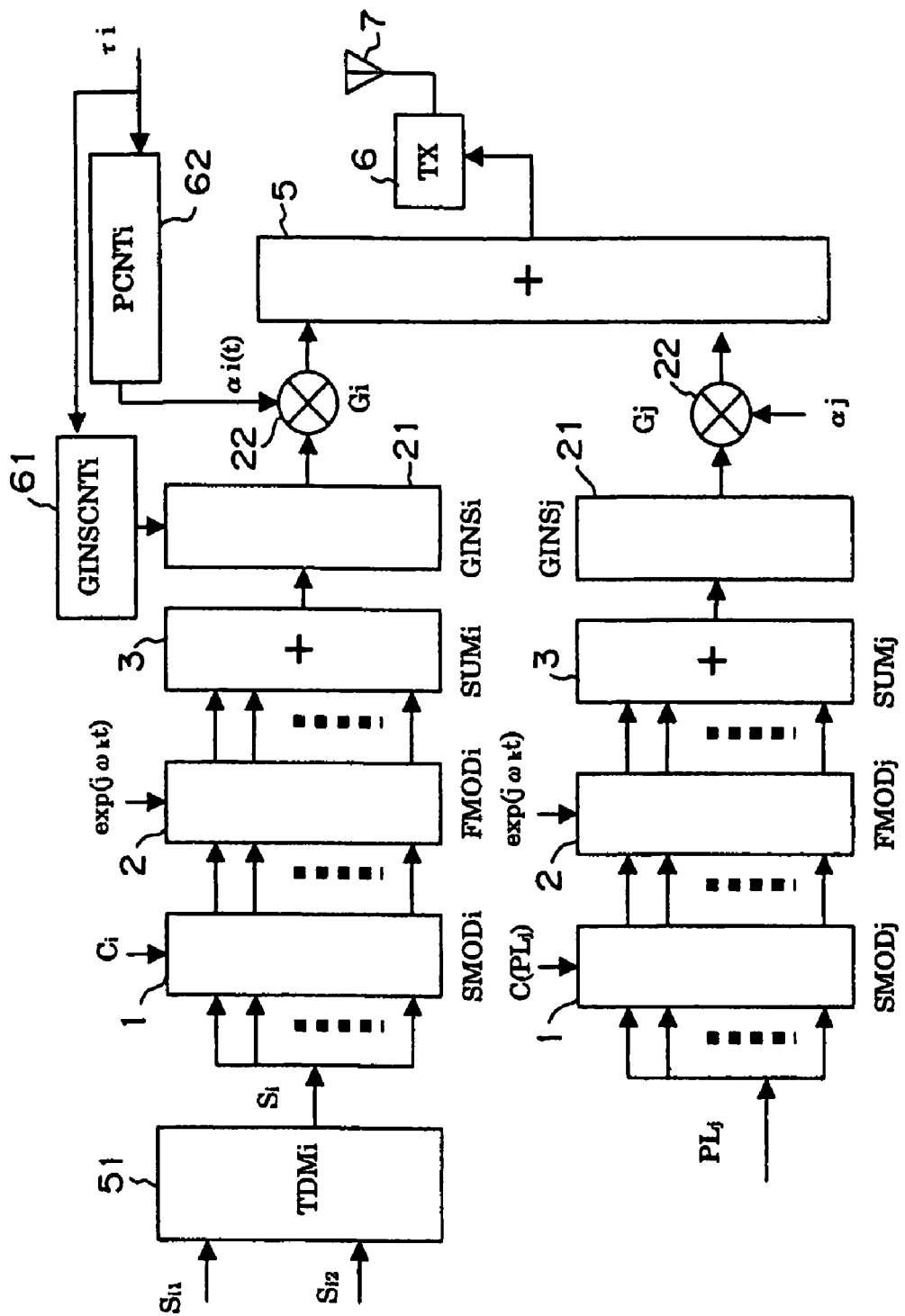
FIG. 35 shows the configuration of the transmission device according to the seventh embodiment of the present invention.

FIG. 35 shows the configuration of the transmission device according to the seventh embodiment of the present invention. The transmission device has the function of modulating and transmitting the known pattern data (PLj), and the function of receiving the maximum transmission delay difference information ($\tau$) and determining the guard interval and the transmission power based on the received information.

The known pattern data (PLj) is spread by the spread modulator 1, and then modulated by the subcarrier modulator 2. The known pattern data (PLj) is not specified, but it is to be recognized by each reception device. The spread modulator 1 is spread the known pattern data (PLj) using the spreading code C(PLj) corresponding to the known pattern data (PLj).

The guard interval insert unit (GINSj) 21 inserts a relatively long guard interval into a signal series for transmission of the known pattern data (PLj). This guard interval can be determined by, for example, assuming that a signal is transmitted to a mobile station (reception device) located farthest in the service area. The gain adjuster (Gj) 22 multiplies by an appropriate gain coefficient $\alpha j$ such that the signal series into which a guard, interval is inserted can be transmitted by sufficiently large transmission power. The gain coefficient $\alpha j$ can be determined by assuming that, for example, a signal is transmitted to a mobile station (reception device) located farthest in the service area. The known pattern data (PLj) is multiplexed with the signal series Si1 and Si2, and then transmitted.

The operations of the guard interval control unit (GINSCNT) 61 and the power control unit (PCNT) 62 are described above by referring to the third embodiment. That is, the guard interval control unit 61 determines the length of the guard interval to be inserted according to the maximum transmission delay difference information transmitted from the corresponding reception device. The power control unit 62 determines the gain coefficient according to the maximum transmission delay difference information transmitted from the corresponding reception device.

FIG. 36 shows the configuration of the reception device according to the seventh embodiment. The reception device has the function of extracting the known pattern data (PLj) and measuring the transmission error of the data, and the function of generating the maximum transmission delay difference information based on the transmission error rate.

The received wave is demodulated by a demodulation circuit. At this time, the spread demodulator (SDEM) 15 uses the spreading code Ci when the signal series Si1 is demodulated, and the spreading code C(PLj) when the known pattern data (PLj) is demodulated. The demultiplexing unit 52 demultiplexes a regenerated signal series into the signal series Si1 and the known pattern data (PLj).

A delay difference detection unit 111 measures the transmission error rate of the regenerated known pattern data (PLj), and generates the maximum transmission delay difference information $\tau$ based on the transmission error rate. The maximum transmission delay difference information $\tau$ is provided for a guard interval control unit (GCNT) 112, and also the transmission device. The guard interval control unit 112 determines the guard interval according to the maximum transmission delay difference information $\tau$, and indicates it to the guard interval deletion unit 31. The guard interval deletion unit 31 deletes the guard interval from the received signal according to the indication.

FIG. 37 is a flowchart of the operation of the delay difference detection unit 111. In this example, it is assumed that plural pieces of guard interval length data $\tau 0$~$\tau n$ are prepared. Among the guard interval length data $\tau 0$~$\tau n$, it is assumed that "$\tau 0$" is the smallest, and "$\tau n$" is the largest. The processes in this flowchart are performed, for example, each time the known pattern data (PLj) is received.

In step S1, the spreading code C(PLj) is set in the spread demodulator 15. The spreading code C(PLj) is used when the known pattern data (PLj) is spread in the transmission device. Thus, when a received signal is inversely spread hereafter, the known pattern data (PLj) is regenerated. In step S2, the variable for designation of the guard interval length is initialized. That is, "i=0" is set.

In step S3, the guard interval length data $\tau i$ is set in the guard interval control unit 112. Since "i=0" at this time, the "guard interval length data $\tau 0$" is set in a guard interval control unit 123. The "guard interval length data $\tau 0$" has the smallest value in the prepared probable data. At this time, the demultiplexing unit 52 outputs data such that the regenerated known pattern data (PLj) is guided to the delay difference detection unit 111.

In step S4, the error rate (number of error bits) of the regenerated known pattern data (PLj) is checked. When the error rate is larger than a predetermined threshold, it is assumed that the sufficient communications quality cannot be obtained, and control is passed to step S5. In step S5, it is checked whether or not the variable i can be incremented. If possible, control is returned to step S3 after the variable i is incremented in step S6.

Thus, in steps S3 through S6, while the guard interval length to be set in the guard interval control unit 112 is gradually increased, the error rate of the known pattern data (PLj) is measured for each length. When the error rate of the known pattern data (PLj) is equal to or smaller than the threshold, control is passed to step S7. Therefore, the shortest possible guard interval can be determined in the range of the desired communications quality in the processes above. At this time, the optimum guard interval is set in the guard interval control unit 112.

In step S7, the spreading code Ci is set in the spread demodulator 15. The spreading code Ci is used when the transmission device spreads the signal series Si1 and Si2. Thereafter, the spread demodulator 15 can demodulate the signal series Si1 from the received signal. In step S8, the guard interval length determined in steps S3 through S6 is transmitted to the transmission device.

As described above, in the seventh embodiment, the length of the guard interval (and the transmission power) is determined while measuring the transmission error rate such that the predetermined communications quality can be reserved.

Therefore, the desired communications quality can be reserved with the shortest possible guard interval and transmission power.

Eighth Embodiment

The communications system according to the eighth embodiment is a variation of the communications system according to the seventh embodiment. That is, the seventh embodiment is configured such that the guard interval to be set in the reception device can be determined and the value is transmitted to the transmission device. On the other hand, in the eighth embodiment, the transmission distance between the transmission device and the reception device is estimated based on the guard interval length to be set in the reception device, and the estimation result is transmitted to the transmission device.

Figure 38:
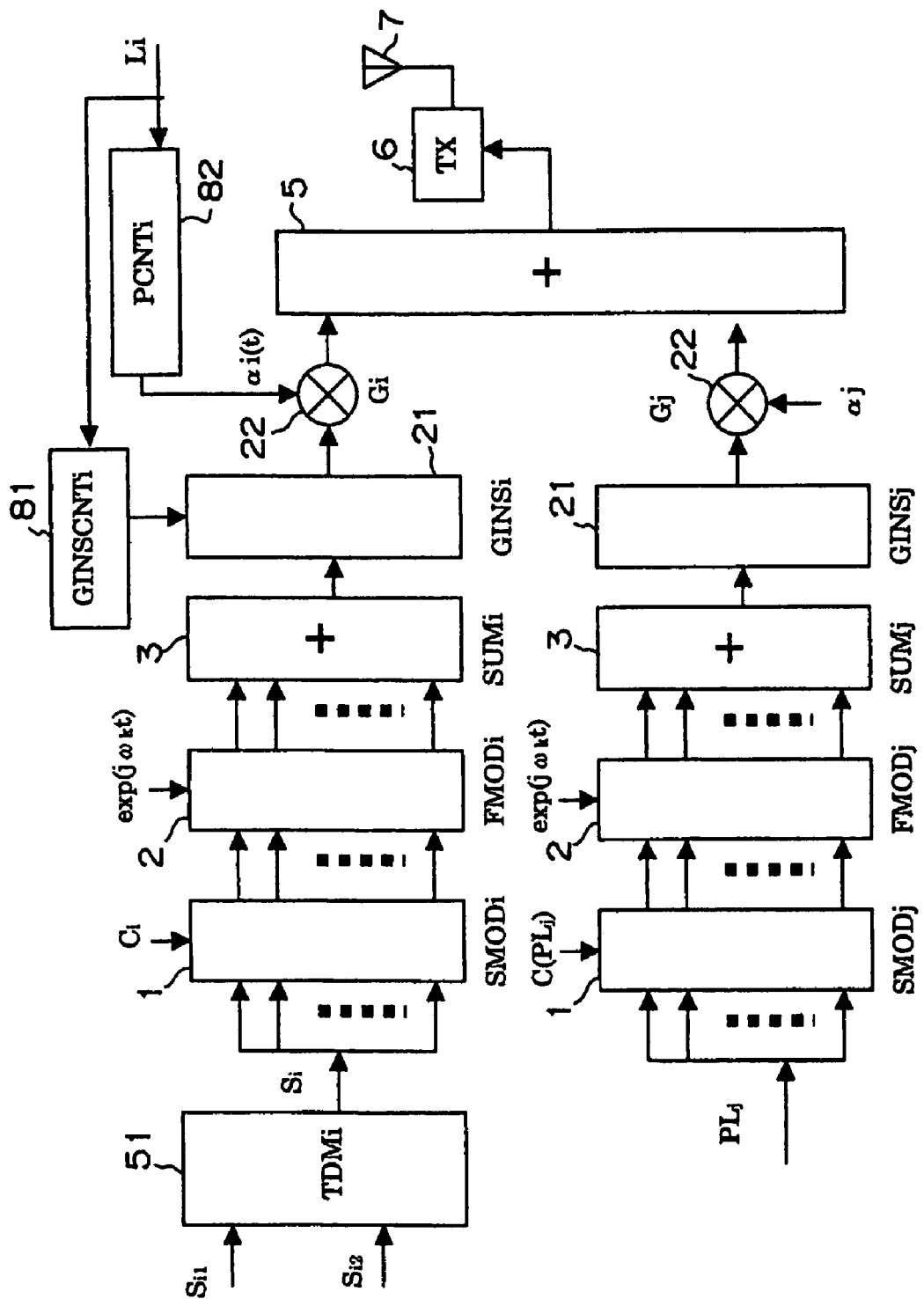
FIG. 38 shows the configuration of the transmission device according to the eighth embodiment of the present invention.

FIG. 38 shows the configuration of the transmission device according to the eighth embodiment. The transmission device is basically the same as the transmission device according to the seventh embodiment shown in FIG. 35. However, the transmission device according to the eighth embodiment is provided with the guard interval control unit (GINSCNT) 81 and the power control unit (PCNT) 82 instead of the guard interval control unit (GINSCNT) 61 and the power control unit (PCNT) 62 shown in FIG. 35. The operations of the guard interval control unit 81 and the power control unit 82 are described above by referring to the fourth embodiment. That is, the guard interval control unit 81 determines the length of the guard interval to be inserted according to the transmission distance information L transmitted from the corresponding reception device. The power control unit 82 determines the gain coefficient α according to the transmission distance information L transmitted from the corresponding reception device.

Figure 39:
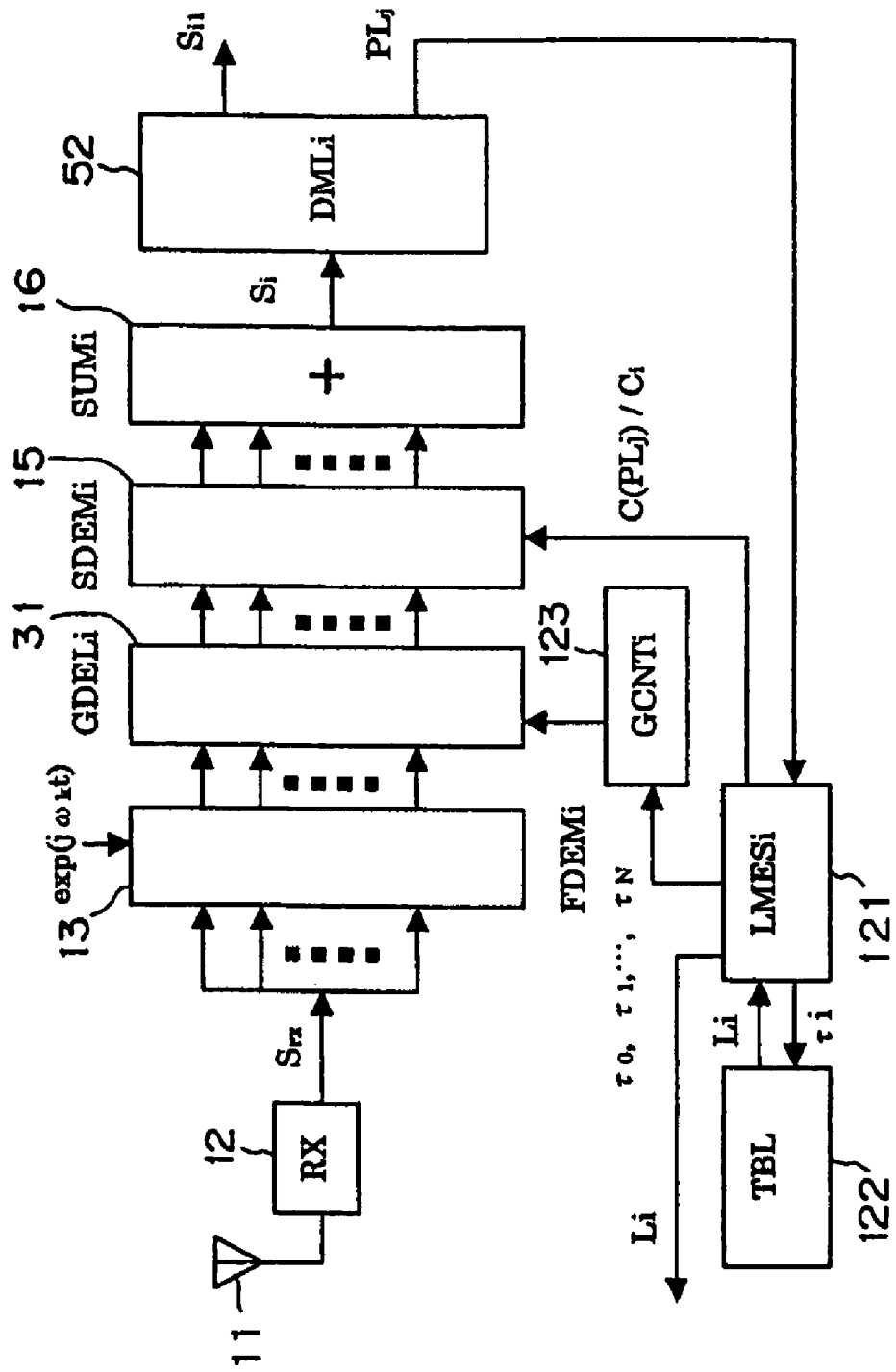
FIG. 39 shows the configuration of the reception device according to the eighth embodiment of the present invention.

FIG. 39 shows the configuration of the reception device according to the eighth embodiment of the present invention. The reception device comprises a distance estimation unit (LMES) 121, a conversion table (TBL) 122, and a guard interval control unit (GCNT) 123 instead of the delay difference detection unit 111 and the guard interval control unit 112 shown in FIG. 36. The distance estimation unit 121 and the guard interval control unit 123 determines the optimum guard interval length as in the seventh embodiment. Then, the distance estimation unit 121 accesses the conversion table 122, and obtains the transmission distance corresponding to the determined guard interval length. Then, the transmission distance information L indicating the transmission distance is transmitted to the transmission device. The conversion table 122 corresponds to the conversion table 85 shown in FIG. 28, and stores the correspondence between the guard interval length and the transmission distance.

Figure 40:
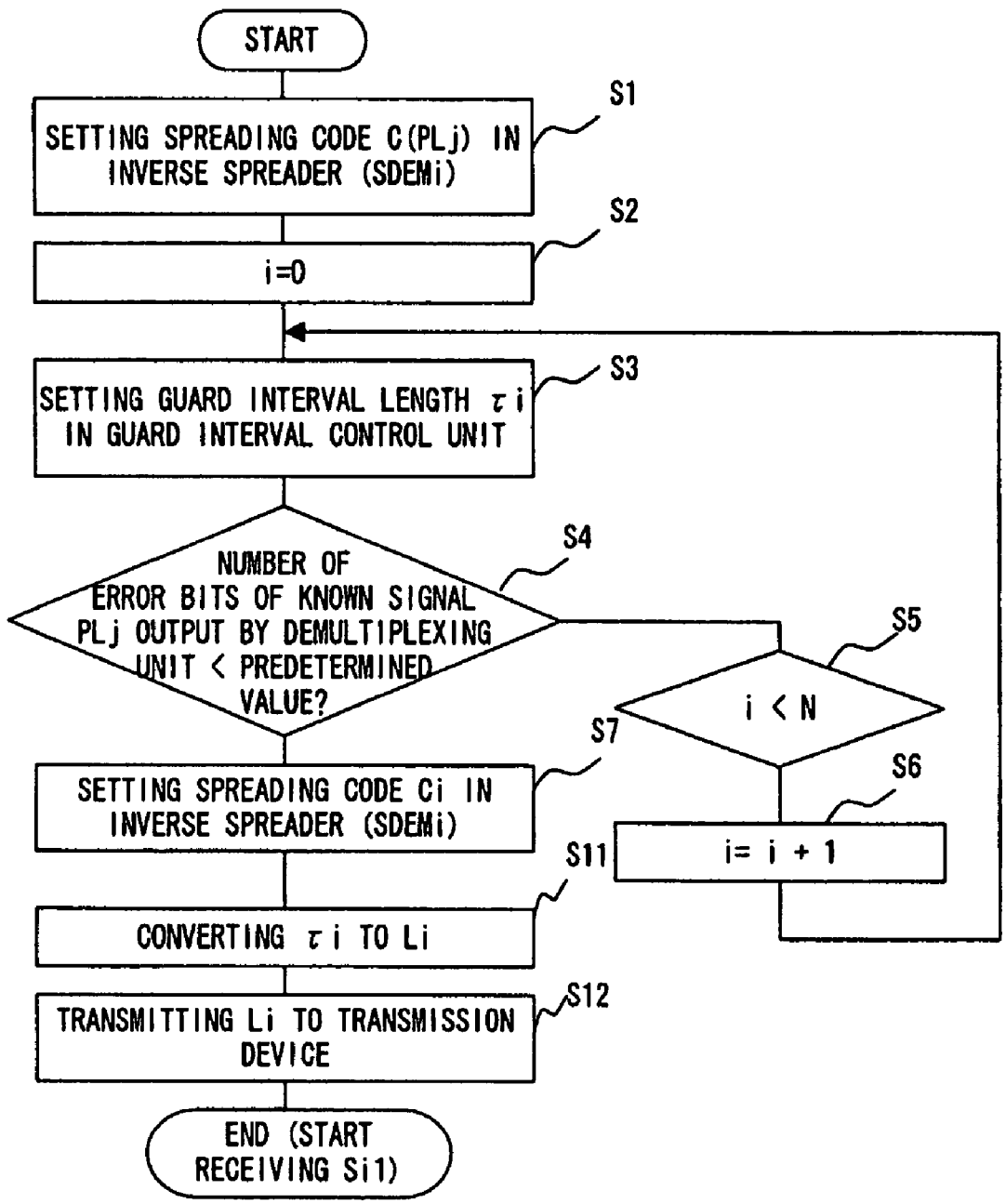
FIG. 40 is a flowchart of the operation of the distance estimate unit shown in FIG. 39.

FIG. 40 is a flowchart of the operations of the distance estimation unit 121 shown in FIG. 39. In FIG. 40, the processes in steps S1 through S7 are the same as those according to the seventh embodiment. That is, in steps S1 through S7, the guard interval length τi to be set in the reception device is determined. Then in step 311, the guard interval length τi is converted into the transmission distance information Li by referring to the guard interval control unit 112. Then, in step S12, the transmission distance information obtained in step S11 is transmitted to the transmission device.

As described above, according to the present invention, since the guard interval and the transmission power is appropriately set depending on the maximum transmission delay difference generated in the transmission link between the base station and the mobile station in the service area in the cellular communications system, the occurrence of interference can be reduced. Otherwise, since the transmission capacity in the transmission band of the transmission link is optimized, the communications system can be efficiently operated with the total transmission capacity increased.

The guard interval and the transmission power may be dynamically controlled depending on the maximum transmission delay difference (or the transmission distance) of the communication links between the transmission device and the reception device, or may also be fixedly set. For example, the guard interval and the transmission power can be determined at the start of communications, and then they can be maintained unchanged until the end of the communications. It is also possible to dynamically adjust the guard interval and the transmission power during the communications. Furthermore, if the locations of the transmission device and the reception device are not changed, the guard interval and the transmission power can be determined in the initializing process.

Furthermore, although the guard interval and the transmission power are determined depending on the maximum transmission delay difference (or the transmission distance) in the present invention, the relationship between the guard interval and the transmission power can be uniquely determined in, for example, an experiment, a simulation, etc.

What is claimed is:

1. A transmission method comprising:
   transmitting a signal from a transmission device to a reception device using orthogonal frequency division multiplex;
   making a transmission power of a first signal relatively larger than a transmission power provided in a transmission period of a second signal series on the basis of a guard interval length corresponding to a maximum transmission delay difference between the transmission device and the reception device, when the first signal and the second signal series are temporally multiplexed and transmitted, wherein the first signal is transmitted to substantially all reception devices in an area formed by the transmission device, and the second signal series are obtained by multiplexing data to be transmitted to each of the plurality of reception devices by using demultiplex according to a time direction, wherein
   the first signal is not transmitted each time the data included in the second signal series is transmitted.

2. A transmission method comprising:
   transmitting a signal from a transmission device to a reception device using orthogonal frequency division multiplex;
   making a power control coefficient of a second signal series smaller than a power control coefficient of a first signal on the basis of a guard interval length corresponding to a maximum transmission delay difference between the transmission device and the reception device, when the first signal and the second signal series are temporally multiplexed and transmitted, wherein the first signal is transmitted to substantially all reception devices in an area formed by the transmission device, and the second signal series are obtained by multiplexing data to be transmitted to each of the plurality of reception devices by using demultiplex according to a time direction, wherein
   the first signal is not transmitted each time the data included in the second signal series is transmitted.

3. A base station comprising:
   a transmitter which transmits a signal to a reception device using orthogonal frequency division multiplex;

a power control unit which makes a transmission power of a first signal relatively larger than a transmission power of a second signal series on the basis of a guard interval length corresponding to a maximum transmission delay difference between the base station and the reception device, when the first signal and the second signal series are temporally multiplexed and transmitted, wherein the first signal is transmitted to substantially all reception devices in an area formed by the base station, and the second signal series are obtained by multiplexing data to be transmitted to each of the plurality of reception devices by using demultiplex according to a time direction, wherein
the first signal is a signal transmitted in a period preceding the second signal series, and is not transmitted each time the data included in the second signal series is transmitted.

4. A base station comprising:
a transmitter which transmits a signal to a reception device using orthogonal frequency division multiplex;
a power control unit which makes a power control coefficient of a second signal series smaller than a power control coefficient of a first signal on the basis of a guard interval length corresponding to a maximum transmission delay difference between the base station and the reception device, when the first signal and the second signal series are temporally multiplexed and transmitted, wherein the first signal is transmitted to substantially all reception devices in an area formed by the base station, and the second signal series are obtained by multiplexing data to be transmitted to each of the plurality of reception devices by using demultiplex according to a time direction, wherein
the first signal is a signal transmitted in a period preceding the second signal series, and is not transmitted each time the data included in the second signal series is transmitted.

5. A system comprising:
a base station and a mobile station;
wherein the base station comprises:
a transmitter that transmits a signal to the mobile station using orthogonal frequency division multiplex,
a power control unit which makes a transmission power of a first signal relatively larger than a transmission power of a second signal series on the basis of a guard interval length corresponding to a maximum transmission delay difference between the base station and the mobile station, when the first signal and the second signal series are temporally multiplexed and transmitted, wherein the first signal is transmitted to substantially all mobile stations in an area formed by the base station, and the second signal series are obtained by multiplexing data to be transmitted to each of the plurality of mobile stations by using demultiplex according to a time direction, wherein
the first signal is a signal transmitted in a period preceding the second signal series, and is not transmitted each time the data included in the second signal series is transmitted; and
the mobile station comprises:
a receiver that receives the first signal and the second signal series.

6. The system of claim 5, wherein
the base station further comprises:
a modulation unit which multiplies a transmission signal series by a code,
an OFDM modulation unit which modulates and arranges, as a signal of a predetermined power, a multiplied series set for each single symbol time in the subcarrier direction of the OFDM, and
a high frequency conversion unit which converts a signal of the OFDM modulation unit into a high frequency signal having a predetermined frequency,
wherein the base station transmits more than one of the high frequency signals that were converted so that they have different frequencies; and
the mobile station further comprises:
a receiver that receives the signals transmitted by the base station.

7. The system of claim 5, wherein
the base station further comprises:
a modulation unit (SMOD) which multiplies a first transmission signal series a by a first code and which multiplies a second transmission signal series to be time-division multiplexed with the first transmission signal series and transmitted by a second code,
an OFDM modulation unit which modulates and arranges, as a signal of a predetermined power, a multiplied series set for each single symbol time in the subcarrier direction of the OFDM, and
a high frequency conversion unit that converts a signal of the OFDM modulation unit into a high frequency signal having a predetermined frequency; and
the mobile station further comprises:
a receiver that receives the signals generated by the base station.

8. The system of claim 5, wherein
the base station further comprises:
a modulation unit (SMOD) which multiplies a first transmission signal series a by a first code and which multiplies a second transmission signal series to be time-division multiplexed with the first transmission signal series and transmitted by a second code,
an OFDM modulation unit which modulates and arranges, as a signal of a predetermined power, a multiplied series set for each single symbol time in the subcarrier direction of the OFDM, and
a high frequency conversion unit that converts a signal of the OFDM modulation unit into a high frequency signal having a predetermined frequency; and
the mobile station further comprises:
a receiver that receives the signals generated by the base station.

9. A system comprising:
a base station and a mobile station;
wherein the base station comprises:
a transmitter that transmits a signal to the mobile station using orthogonal frequency division multiplex,
a power control unit which makes a power control coefficient of a second signal series smaller than a power control coefficient of a first signal on the basis of a guard interval length corresponding to a maximum transmission delay difference between the base station and the mobile station, when the first signal and the second signal series are temporally multiplexed and transmitted, wherein the first signal is transmitted to substantially all mobile stations in an area formed by the base station, and the second signal series are obtained by multiplexing data to be transmitted to each of the plurality of mobile stations by using demultiplex according to a time direction, wherein the first signal is a signal transmitted in a period preceding the second signal series, and is not transmitted each time the data included in the second signal series is transmitted; and the mobile station comprises:

a receiver that receives the first signal and the second signal series.

10. The system of claim 9, wherein
the base station further comprises:
a modulation unit which multiplies a transmission signal series by a code,
an OFDM modulation unit which modulates and arranges, as a signal of a predetermined power, a multiplied series set for each single symbol time in the subcarrier direction of the OFDM, and
a high frequency conversion unit which converts a signal of the OFDM modulation unit into a high frequency signal having a predetermined frequency,
wherein the base station transmits more than one of the high frequency signals that were converted so that they have different frequencies; and
the mobile station further comprises:
a receiver that receives the signals transmitted by the base station.

11. The system of claim 9, wherein
the base station further comprises:
a modulation unit (SMOD) which multiplies a first transmission signal series a by a first code and which multiplies a second transmission signal series to be time-division multiplexed with the first transmission signal series and transmitted by a second code,
an OFDM modulation unit which modulates and arranges, as a signal of a predetermined power, a multiplied series set for each single symbol time in the subcarrier direction of the OFDM, and
a high frequency conversion unit that converts a signal of the OFDM modulation unit into a high frequency signal having a predetermined frequency; and
the mobile station further comprises:
a receiver that receives the signals generated by the base station.

12. The system of claim 9, wherein
the base station further comprises:
a modulation unit (SMOD) which multiplies a first transmission signal series a by a first code and which multiplies a second transmission signal series to be time-division multiplexed with the first transmission signal series and transmitted by a second code,
an OFDM modulation unit which modulates and arranges, as a signal of a predetermined power, a multiplied series set for each single symbol time in the subcarrier direction of the OFDM, and
a high frequency conversion unit that converts a signal of the OFDM modulation unit into a high frequency signal having a predetermined frequency; and
the mobile station further comprises:
a receiver that receives the signals generated by the base station.

13. A transmission method comprising:
at the base station, performing:
transmitting a signal from the base station to a mobile station using orthogonal frequency division multiplex,
making a transmission power of a first signal relatively larger than a transmission power of a second signal series on the basis of a guard interval length corresponding to a maximum transmission delay difference between the base station and the mobile station, when the first signal and the second signal series are temporally multiplexed and transmitted, wherein the first signal is transmitted to substantially all mobile stations in an area formed by the base station, and the second signal series are obtained by multiplexing data to be transmitted to each of the plurality of mobile stations by using demultiplex according to a time direction, wherein
the first signal is a signal transmitted in a period preceding the second signal series, and is not transmitted each time the data included in the second signal series is transmitted; and
at the mobile station, performing:
receiving the first signal and the second signal series.

14. The transmission method of claim 13, wherein the method further comprises:
at the base station, further performing:
multiplying a transmission signal series by a code,
modulating and arranging, as a signal of a predetermined power, a multiplied series set for each single symbol time in the subcarrier direction of an OFDM,
converting a signal of the OFDM modulation unit into a high frequency signal having a predetermined frequency, and
transmitting more than one of the high frequency signals that were converted so that they have different frequencies; and
at the mobile radio station, further performing:
receiving the signals transmitted by the base station.

15. The transmission method of claim 13, wherein the method further comprises:
at the base station, further performing:
multiplying a first transmission signal series a by a first code and multiplying a second transmission signal series to be time-division multiplexed with the first transmission signal series and transmitted by a second code,
modulating and arranging, as a signal of a predetermined power, a multiplied series set for each single symbol time in the subcarrier direction of and OFDM, and
converting a signal of the OFDM modulation unit into a high frequency signal having a predetermined frequency; and
at the mobile radio station, further performing:
receiving the signals generated by the base station.

16. The transmission method of claim 13, wherein the method further comprises:
at the base station, further performing:
multiplying a first transmission signal series a by a first code and multiplying a second transmission signal series to be time-division multiplexed with the first transmission signal series and transmitted by a second code,
modulating and arranging, as a signal of a predetermined power, a multiplied series set for each single symbol time in the subcarrier direction of and OFDM, and
converting a signal of the OFDM modulation unit into a high frequency signal having a predetermined frequency; and
at the mobile radio station, further performing:
receiving the signals generated by the base station.

17. A transmission method comprising:
at the base station, performing:
transmitting a signal from the base station to a mobile station using orthogonal frequency division multiplex,
making a power control coefficient of a second signal series smaller than a power control coefficient of a first signal on the basis of a guard interval length corresponding to a maximum transmission delay difference between the base station and the mobile station, when the first signal and the second signal series are temporally multiplexed and transmitted, wherein the first signal is transmitted to substantially all mobile stations in an area formed by the base station, and the second signal series are obtained by multiplexing data to be transmitted to each of the plurality of mobile stations by using demultiplex according to a time direction, wherein the first signal is a signal transmitted in a period preceding the second signal series, and is not transmitted each time the data included in the second signal series is transmitted; and at the mobile station, performing:

receiving the first signal and the second signal series.

18. The transmission method of claim 17, wherein the method further comprises:

at the base station, further performing:

multiplying a transmission signal series by a code, modulating and arranging, as a signal of a predetermined power, a multiplied series set for each single symbol time in the subcarrier direction of an OFDM, converting a signal of the OFDM modulation unit into a high frequency signal having a predetermined frequency, and transmitting more than one of the high frequency signals that were converted so that they have different frequencies; and at the mobile station, performing:

receiving the signals transmitted by the base station.

19. The transmission method of claim 17, wherein the method further comprises:

at the transmission device, further performing:

multiplying a first transmission signal series a by a first code and multiplying a second transmission signal series to be time-division multiplexed with the first transmission signal series and transmitted by a second code, modulating and arranging, as a signal of a predetermined power, a multiplied series set for each single symbol time in the subcarrier direction of and OFDM, and converting a signal of the OFDM modulation unit into a high frequency signal having a predetermined frequency; and at the mobile station, performing:

receiving the signals generated by the base station.

20. The transmission method of claim 17, wherein the method further comprises:

at the transmission device, further performing:

multiplying a first transmission signal series a by a first code and multiplying a second transmission signal series to be time-division multiplexed with the first transmission signal series and transmitted by a second code, modulating and arranging, as a signal of a predetermined power, a multiplied series set for each single symbol time in the subcarrier direction of and OFDM, and converting a signal of the OFDM modulation unit into a high frequency signal having a predetermined frequency; and at the mobile station, performing:

receiving the signals generated by the base station.

\* \* \* \* \*